US008456448B2

(12) United States Patent
Rekimoto

(10) Patent No.: US 8,456,448 B2
(45) Date of Patent: Jun. 4, 2013

(54) LIGHT-TACTILITY CONVERSION SYSTEM, AND METHOD FOR PROVIDING TACTILE FEEDBACK

(75) Inventor: Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 12/721,235

(22) Filed: Mar. 10, 2010

(65) Prior Publication Data

US 2010/0238108 A1 Sep. 23, 2010

(30) Foreign Application Priority Data

Mar. 19, 2009 (JP) ................. P2009-068632

(51) Int. Cl.
*G09G 5/00* (2006.01)
(52) U.S. Cl.
USPC ............... 345/175; 463/34; 463/37; 715/702
(58) Field of Classification Search
USPC . 345/156, 173, 175; 463/34, 37, 38; 715/701, 715/702
See application file for complete search history.

(56) References Cited

U.S. PATENT DOCUMENTS

| 5,426,981 | A | * | 6/1995 | Cook et al. ...................... 73/655 |
| 6,535,201 | B1 | * | 3/2003 | Cooper et al. ................ 345/173 |
| 6,747,631 | B1 | * | 6/2004 | Sakamaki et al. ............ 345/157 |
| 7,589,714 | B2 | * | 9/2009 | Funaki .......................... 345/173 |
| 8,212,783 | B2 | * | 7/2012 | Kim et al. ..................... 345/173 |
| 2002/0140667 | A1 | * | 10/2002 | Horiki ........................... 345/156 |
| 2002/0158836 | A1 | * | 10/2002 | Ishmael et al. ............... 345/156 |
| 2003/0128265 | A1 | * | 7/2003 | Barbehenn .................... 347/105 |
| 2004/0238267 | A1 | * | 12/2004 | Sakamoto et al. ............. 181/157 |
| 2005/0243072 | A1 | * | 11/2005 | Denoue et al. ................ 345/179 |
| 2008/0129705 | A1 | * | 6/2008 | Kim et al. ..................... 345/174 |
| 2009/0002328 | A1 | * | 1/2009 | Ullrich et al. ................. 345/173 |
| 2009/0267902 | A1 | * | 10/2009 | Nambu et al. ................ 345/173 |

OTHER PUBLICATIONS

Fukumoto et al.; "Active Click: Tactile Feedback for Touch Panels", Proc. of ACM SIGCHI, pp. 121-122, (2001).
Poupyrev et al.; "Ambient Touch: Designing Tactile Interferences for Handheld Devices", Proceedings of the 15th Annual ACM Symposium on User Interface Software and Technology Table of Contents, pp. 51-60, (2002).
"Mixed Reality with Multi-Finger Interaction", Recent Advances, http://sklab-www.pi.titech.ac.jp/frame_index-j.html., pp. 1-3, 2009.
"Phantom Omni", Force Feedback Device, http://www.vrealities.com/phantomomni.html., pp. 1-3, 2009.

* cited by examiner

*Primary Examiner* — Tom Sheng
(74) *Attorney, Agent, or Firm* — Finnegan, Henderson, Farabow, Garrett & Dunner, LLP

(57) ABSTRACT

A light-tactility conversion system is provided which includes a light emitting device including an illumination unit capable of emitting light at a same time to a plurality of illumination areas in different illumination patterns, and an illumination control unit for controlling the illumination unit and making the illumination unit project an image, and also for controlling the illumination patterns in units of pixels of the projected image and making the illumination unit emit light to specific illumination areas in specific illumination patterns, and a vibration device including an illumination pattern detection unit for detecting an illumination pattern of light received from the light emitting device, and a vibration control unit for generating a vibration pattern corresponding to the illumination pattern detected by the illumination pattern detection unit and vibrating an oscillator in the vibration pattern.

9 Claims, 16 Drawing Sheets

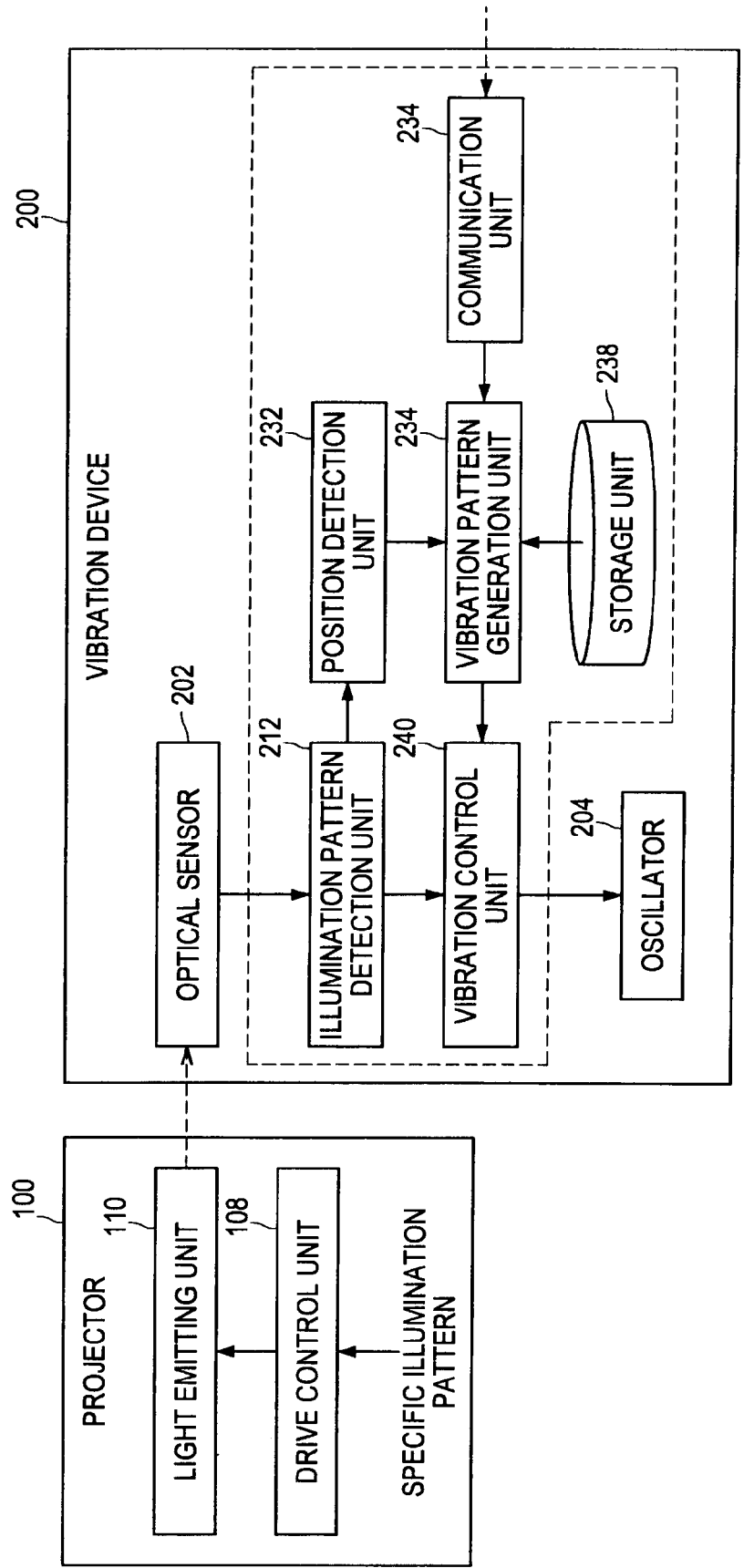

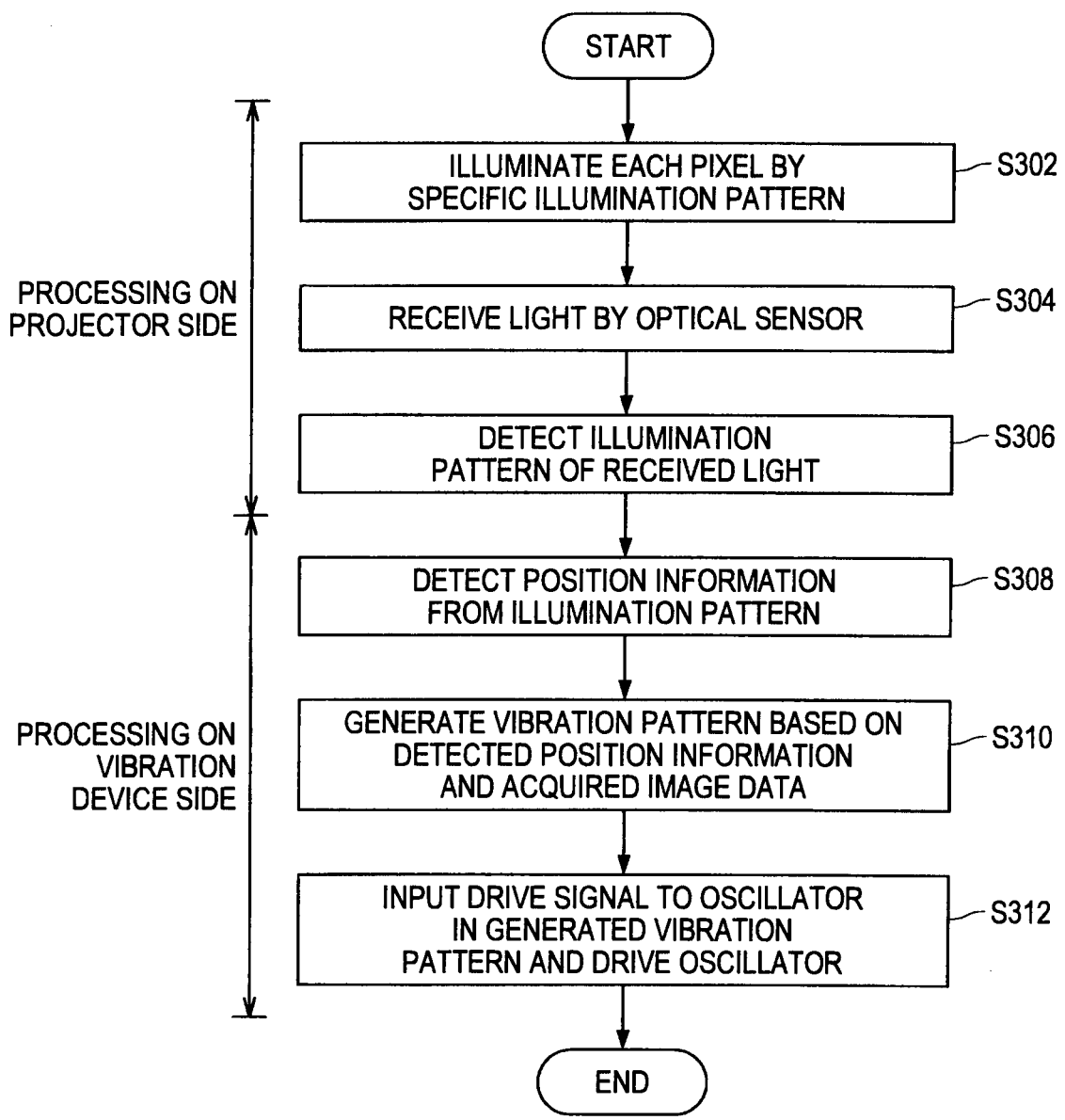

LIGHT-TACTILITY CONVERSION SYSTEM, AND METHOD FOR PROVIDING TACTILE FEEDBACK

BACKGROUND OF THE INVENTION

1. Field of the Invention

The present invention relates to a light-tactility conversion system, and a method for providing a tactile feedback.

2. Description of the Related Art

In recent years, earnest researches are conducted to develop an operation interface such as a personal computer (hereinafter, "PC") or various types of electronic devices (hereinafter, "PC or the like") to be more intuitive and operable. In many cases, the operation interface such as a PC or the like uses in combination a physical input device, such as a mouse or a keyboard, and a graphical user interface (hereinafter, "GUI") displayed on a screen. Furthermore, many small electronic devices adopt a touch panel as the operation interface. Using a touch panel enables an operation feeling that a GUI displayed on a screen is directly operated by a finger or the like, and thus, a highly intuitive and operable operation interface is realized.

However, since the shape of the screen does not change upon the pressing of a button on the GUI, a tactile feedback that is felt by a user at the time of pressing a button in the real world is not obtained. However, it is possible to provide a user with a virtual tactile feedback. For example, M. Fukumoto and T. Sugimura, Active click: tactile feedback for touch panels, proc. of ACM SIGCHI 2001, Pages: 121-122, ISBN: 1-58113-340-5, 2001 and I. Poupyrev, S. Maruyama and J. Rekimoto, Ambient touch: designing tactile interfaces for handheld devices, Proceedings of the 15th annual ACM symposium on User interface software and technology table of contents, pp. 51-60, 2002 disclose technologies for vibrating the touch panel according to a user operation and generating a virtual tactile feedback. The technology of M. Fukumoto and T. Sugimura relates to a technology for vibrating the touch panel by a voice coil. On the other hand, the technology of I. Poupyrev, S. Maruyama and J. Rekimoto relates to a technology for generating a vibration at the touch panel by an oscillator formed from multilayer ceramics.

Furthermore, in recent years, a technology for providing a force feedback to a user's three-dimensional movement is developed. For example, http://skla-bwww.pi.titech.ac.jp/frame_index-j.html and http://www.vrealities.com/phantomomni.html disclose technologies for restraining the body of a user or an operating tool (hereinafter, "operating tool or the like") by using a string or a mechanical structure and generating a force sensation by controlling the restraining force on the operating tool or the like according to a user operation. More specifically, the technology described in http://www.vrealities.com/phantomomni.html is for measuring the position of the operating tool or the like by using the mechanical structure and generating a force feedback according to the measurement result. For example, a virtual cube is set, and a control is performed to generate a repulsive feedback at the time the operating tool or the like enters the cube.

SUMMARY OF THE INVENTION

However, according to the methods described in M. Fukumoto and T. Sugimura, and I. Poupyrev, S. Maruyama and J. Rekimoto, a user has to be physically in contact with the touch panel or the like. Thus, a region at which the tactile feedback can be received is limited to a two-dimensional plane such as the touch panel. Also, according to the methods described in http://sklab-www.pi.titech.ac.jp/frame_index-j.html and http://www.vrealities.com/phantomomni.html, a region at which the force feedback can be received is limited to the movable range of the string or the mechanical structure. Furthermore, in case of using any of the methods of the above-described documents, the position of the operating tool or the like has to be measured to determine whether a feedback is to be generated and what kind of feedback is to be generated. Thus, a measurement time for measuring the position of the operating tool or the like occurs, and a time-lag occurs between the movement of the operating tool or the like and the generation of the feedback. As a result, the effect of the feedback is reduced, or a false shape different from the virtual shape which was set is notified to a user.

Thus, in light of the foregoing, it is desirable to provide novel and improved a light-tactility conversion system and method for providing a tactile feedback capable of reducing the limitation on a region at which a tactile feedback can be received, and also of providing a feedback more accurately and at a higher speed.

According to an embodiment of the present invention, there is provided a light-tactility conversion system including a light emitting device including an illumination unit capable of emitting light at a same time to a plurality of illumination areas in different illumination patterns, and an illumination control unit for controlling the illumination unit and making the illumination unit project an image, and also for controlling the illumination patterns in units of pixels of the projected image and making the illumination unit emit light to specific illumination areas in specific illumination patterns, and a vibration device including an illumination pattern detection unit for detecting an illumination pattern of light received from the light emitting device, and a vibration control unit for generating a vibration pattern corresponding to the illumination pattern detected by the illumination pattern detection unit and vibrating an oscillator in the vibration pattern.

Furthermore, the vibration control unit may be configured to transmit a drive signal for vibrating the oscillator by a specific vibration amount, in synchronization with the illumination pattern detected by the illumination pattern detection unit.

Furthermore, the illumination control unit may be configured to control, by using a specific illumination pattern indicating a specific code, the illumination unit to emit light to a specific illumination area in the specific illumination pattern. Also, the vibration control unit may be configured to regenerate the specific code corresponding to the illumination pattern detected by the illumination pattern detection unit, and vibrate the oscillator in a specific vibration pattern corresponding to the specific code.

Furthermore, the illumination control unit may be configured to make light emitted in a specific pattern different for each colour, according to the colour of each pixel of the projected image.

Furthermore, the light emitting device may have first and second illumination units with different light emitting directions. In this case, the illumination control unit controls the first and second illumination units and makes the first and second illumination units emit light to specific target areas in specific illumination patterns. Furthermore, the illumination pattern detection unit detects each of the illumination patterns of the light emitted from the first and second illumination units included in the light emitting device. Also, the vibration control unit makes the oscillator vibrate in a vibration pattern associated in advance with a combination of the illumination pattern of the light emitted from the first illumination unit and the illumination pattern of the light emitted from the second illumination unit.

Furthermore, the illumination control unit may be configured to control the first and second illumination units, and, by using specific illumination patterns indicating specific codes, make the first and second illumination units emit light to specific illumination areas in the specific illumination patterns. In this case, the vibration control unit regenerates each of the specific codes corresponding to the respective illumination patterns of light emitted from the first and second illumination units, the illumination patterns being detected by the illumination pattern detection unit, and vibrates the oscillator in a specific vibration pattern corresponding to a combination of the specific codes.

Furthermore, the illumination unit may include a light source for emitting light, a plurality of mirrors provided for each pixel of the projected image, the plurality of mirrors being capable of guiding the light emitted from the light source to a lens, and a mirror control unit for controlling an angle of each mirror. In this case, the mirror control unit controls the illumination patterns in units of pixels of the projected image by changing the angle of each mirror according to a control by the illumination control unit.

According to another embodiment of the present invention, there is provided a tactile feedback providing method including the steps of controlling an illumination device capable of emitting light at a same time to a plurality of illumination areas in different illumination patterns and making the illumination device project an image, and also controlling the illumination patterns in units of pixels of the projected image and making the illumination device emit light to specific illumination areas in specific illumination patterns, receiving the light emitted under a control in the step of controlling, detecting an illumination pattern of the light received in the step of receiving, and generating a vibration pattern corresponding to the illumination pattern detected in the step of detecting and vibrating an oscillator in the vibration pattern.

According to the embodiments of the present invention described above, limitation on a region at which a feedback can be received can be reduced, and also, the feedback can be provided accurately and at a high speed.

BRIEF DESCRIPTION OF THE DRAWINGS

FIG. 15 is an explanatory diagram showing functional configuration examples of a projector and a vibration device according to the present embodiment; and FIG. 16 is an explanatory diagram showing an example of a feedback generation method according to the present embodiment.

DETAILED DESCRIPTION OF THE EMBODIMENT(S)

Figure 1:
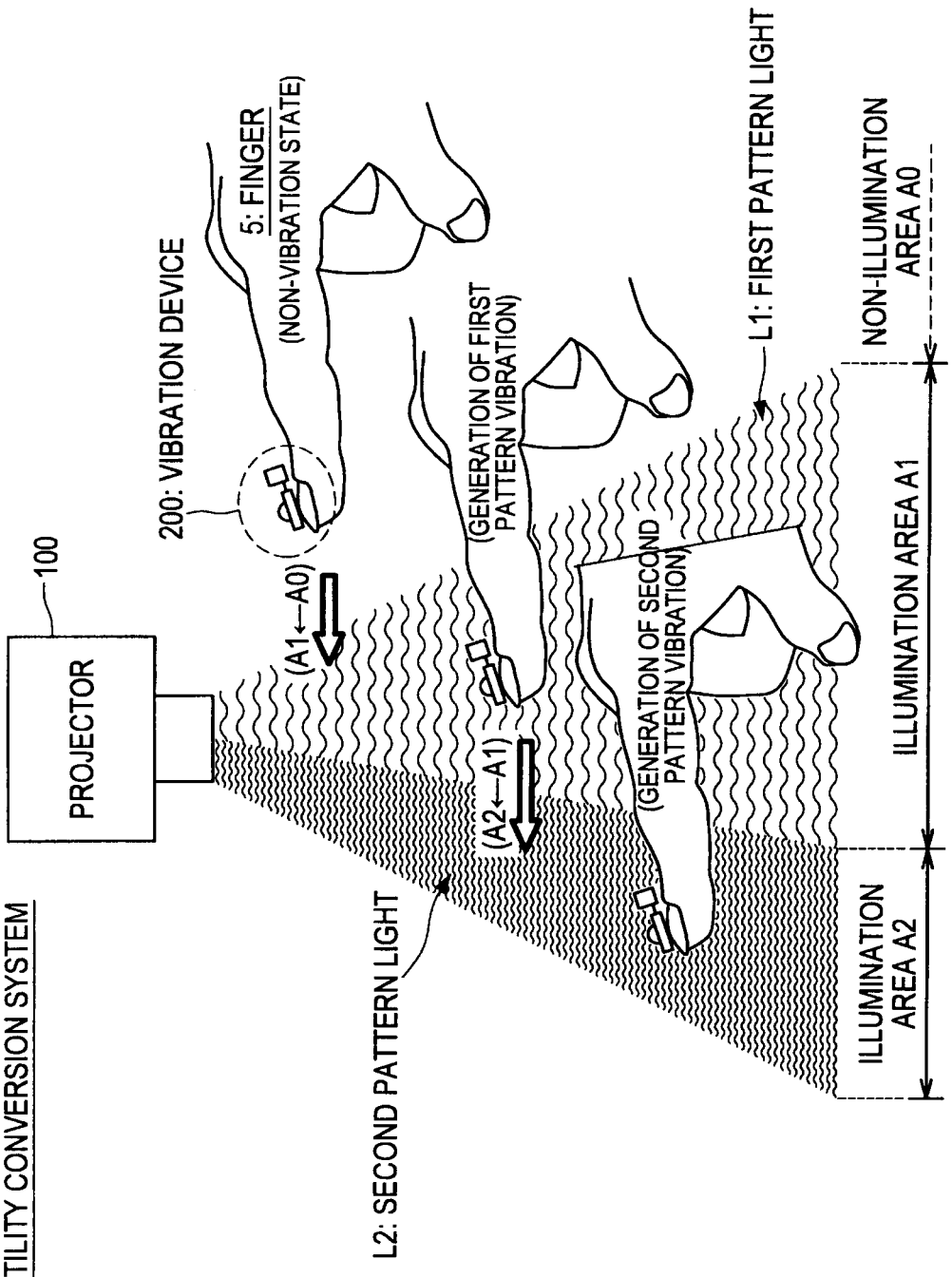
FIG. 1 is an explanatory diagram showing a configuration example of a light-tactility conversion system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Explanation>

Here, a flow of explanation of an embodiment of the present invention described below will be briefly stated. First, with reference to FIG. 1, a configuration of a light-tactility conversion system 10 according to a first embodiment of the present invention will be described. At the same time, a light emission control method of a projector 100 according to the present embodiment will be described with reference to FIGS. 2 and 3. Furthermore, with reference to FIG. 4, a device configuration of a vibration device 200 according the present embodiment will be described.

Figure 5:
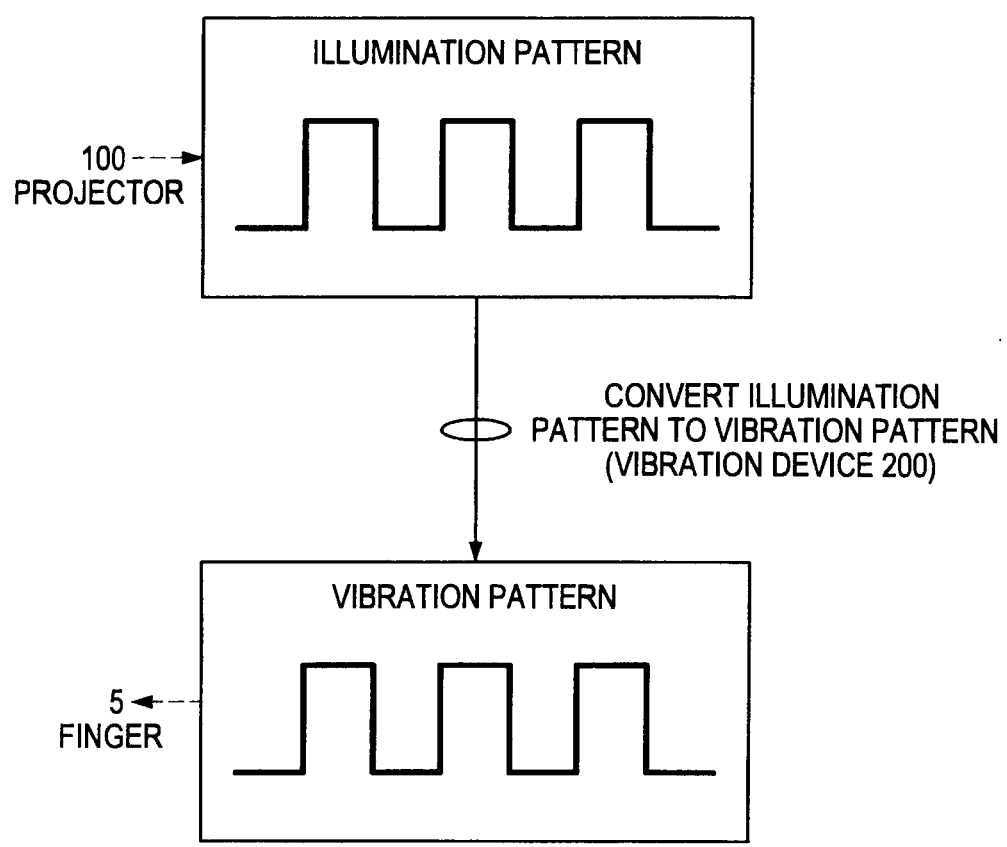
FIG. 5 is an explanatory diagram showing a vibration pattern generation method according to the present embodiment.

Next, with reference to FIG. 5, a generation method for a vibration pattern according to the present embodiment will be described. Then, with reference to FIG. 6, functional configurations of the projector 100 and the vibration device 200 according to the present embodiment will be described. Then, with reference to FIG. 7, a generation method for a tactile feedback according to the present embodiment will be described. Then, with reference to FIG. 8, a modified example of the vibration device 200 according to the present embodiment will be simply described. Then, with reference to FIGS. 9 and 10, application examples of the light-tactility conversion system 10 according to the present embodiment will be described.

Figure 11:
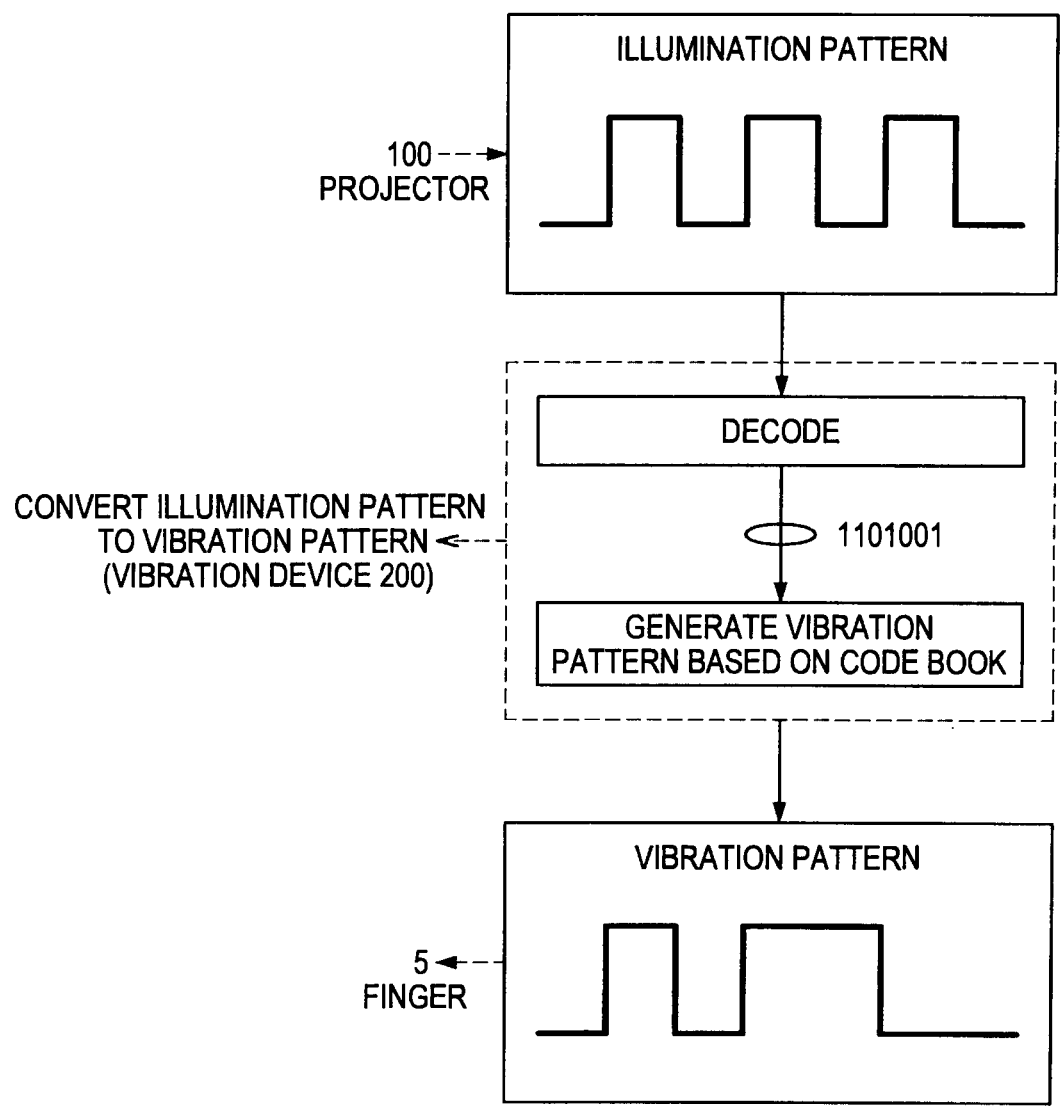
FIG. 11 is an explanatory diagram showing a vibration pattern generation method according to a second embodiment of the present invention.

Next, with reference to FIG. 11, a generation method for a vibration pattern according to a second embodiment of the present invention will be described. Then, with reference to FIG. 12, functional configurations of a projector 100 and a vibration device 200 according to the present embodiment will be described. Then, with reference to FIG. 13, a generation method for a tactile feedback according to the present embodiment will be described. Then, with reference to FIG. 14, a generation method for a vibration pattern according to a third embodiment of the present invention will be described. Then, with reference to FIG. 15, functional configurations of a projector 100 and a vibration device 200 according to the present embodiment will be described. Then, with reference to FIG. 16, a generation method for a tactile feedback according to the present embodiment will be described.

(Explanation Items)

1: First Embodiment (Configuration for Generating Vibration Pattern Directly from Illumination Pattern)

1-1: Configuration of Light-Tactility Conversion System 10

1-2: Vibration Pattern Generation Method 1-3: Functional Configurations of Projector 100 and Vibration Device 200

1-4: Overall Flow of Feedback Generation Process 1-5: Application Example 1-5-1: Modified Example of Vibration Device 200

1-5-2: Mode of Using Light-Tactility Conversion System 10

1-5-3: Modified Example of Projector 100 (Extension to Three-Dimensions)

2: Second Embodiment (Configuration for Generating Vibration Pattern by Using Code Book)

2-1: Vibration Pattern Generation Method 2-2: Functional Configurations of Projector 100 and Vibration Device 200

2-3: Overall Flow of Feedback Generation Process

3: Third Embodiment (Configuration for Using Illumination Pattern as Position Information)

3-1: Vibration Pattern Generation Method 3-2: Functional Configurations of Projector 100 and Vibration Device 200

3-3: Overall Flow of Feedback Generation Process

4: Conclusion

<1: First Embodiment>

First, a first embodiment of the present invention will be described. The present embodiment relates to a method of providing a tactile feedback different for each illumination area by emitting light in an illumination pattern different for each illumination area and by receiving the emitted light by an optical sensor and converting the same to a vibration pattern. Particularly, the present embodiment relates to a method of converting, as it is, a waveform of the illumination pattern to the vibration pattern.

(1-1: Configuration of Light-Tactility Conversion System 10)

First, referring to FIG. 1, the configuration of a light-tactility conversion system 10 will be described. FIG. 1 is an explanatory diagram showing a configuration example of the light-tactility conversion system 10 according to the present embodiment. As shown in FIG. 1, the light-tactility conversion system 10 is configured from a projector 100 for emitting light and a vibration device 200 to be attached to a user's finger 5 or the like. However, the attachment mode of the vibration device 200 is not limited to the example shown in FIG. 1.

(Projector 100)

First, the projector 100 will be described. The projector 100 has a function of emitting light on a plurality of illumination areas in different illumination patterns. For example, as shown in FIG. 1, the projector 100 can emit light L1 of a first pattern to an illumination area A1, and emit light L2 of a second pattern to an illumination area A2. The illumination pattern here means a waveform pattern indicating a blinking timing of light and an illumination time. This function is realized by a Digital Light Processing (DLP) projector (registered trademark), for example.

The DLP projector has a structure for controlling the angle of a micromirror called a Digital Micromirror Device (DMD) provided for each pixel and for adjusting a duration of light emitted from a light source entering a lens via the micromirror. With this structure, the DLP projector expresses a brightness and a colour by controlling, for each pixel, the amount of light entering a lens from a light source. Applying this structure enables to project light on a screen with pixels blinking at different timings. That is, the function of the projector 100 described above can be realized in units of pixels.

Figure 2:
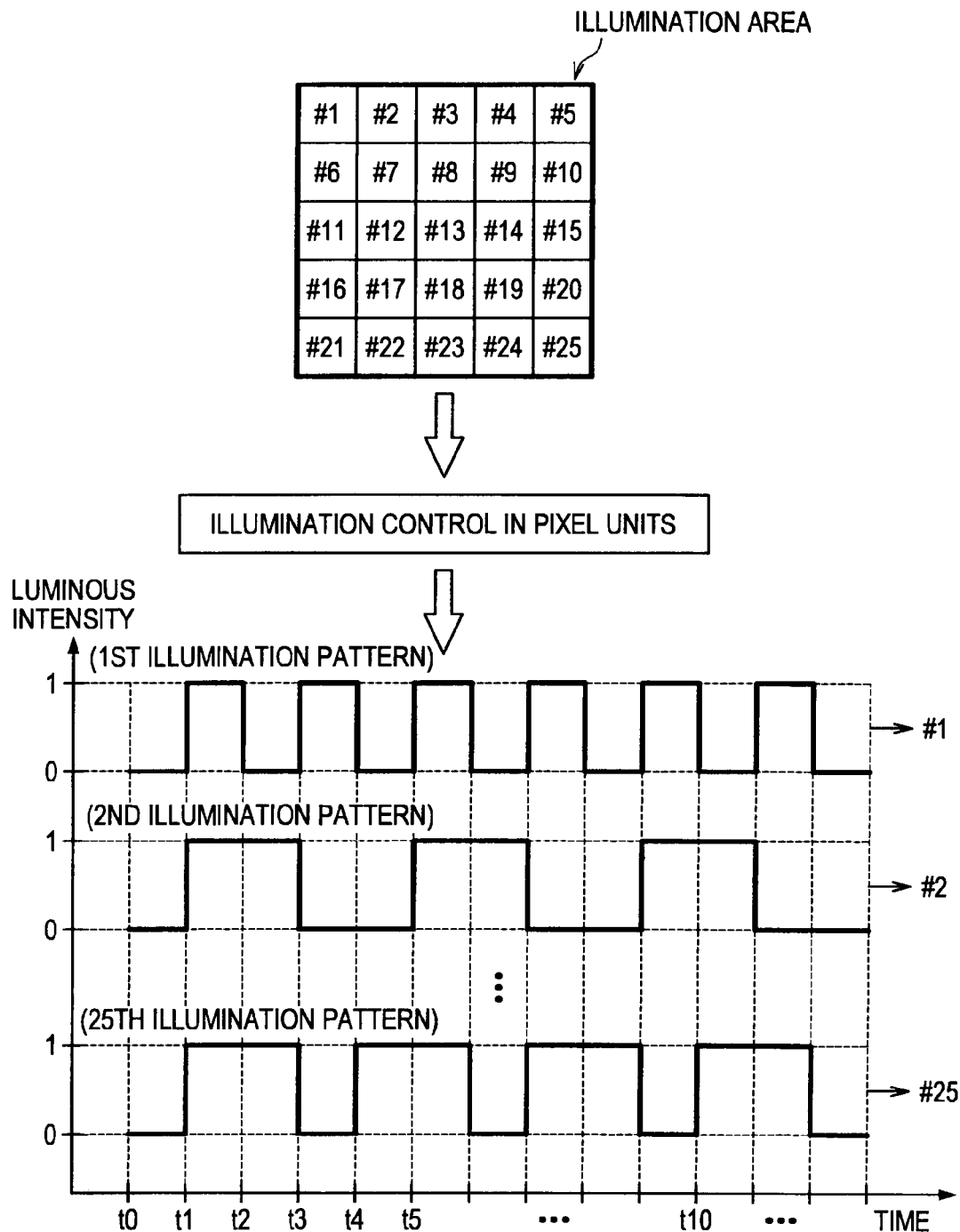
FIG. 2 is an explanatory diagram showing an example of an illumination control method of a projector according to the present embodiment.

For example, as shown in FIG. 2, when a plurality of pixels exist in an illumination area of light, the projector 100 can illuminate respective pixels with light of different patterns by controlling the illumination pattern for each pixel. In the example of FIG. 2, a k-th pixel (#k; k=1, . . . , 25) is illuminated with light of k-th illumination pattern. By illuminating each pixel with light of different illumination pattern in this manner, it becomes possible to specify a light receiving position from the illumination pattern of the received light. Accordingly, with the light-tactility conversion system 10, a position measurement is possible without using a mechanical structure.

The example of FIG. 2 showed a method of emitting light in illumination patterns different for respective pixels. However, with the light-tactility conversion system 10, it is possible to project an image in the illumination area. Thus, the projector 100 can project an image in the illumination area while emitting light in illumination patterns each in accordance with the colour of a pixel forming the image. The brightness and colour of each pixel is determined based on the wavelength of the light or the luminous intensity per unit time. That is, if the amount of light emitted per unit time is the same, a substantially same brightness can be obtained even if the number of blinking times per unit time or the pattern is different. Of course, the wavelength of the light and the illumination pattern are not related to each other.

Figure 3:
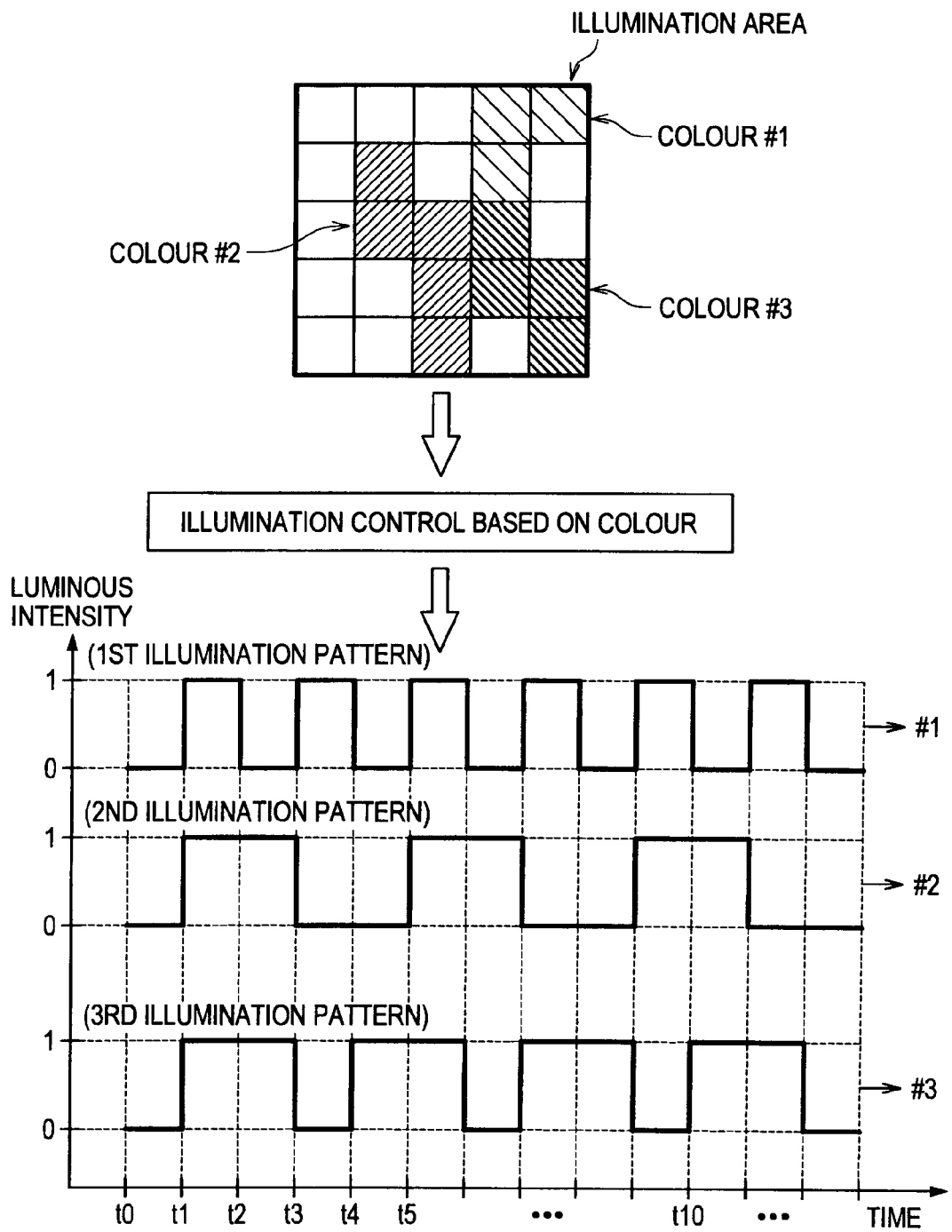
FIG. 3 is an explanatory diagram showing an example of the illumination control method of the projector according to the present embodiment.

Accordingly, as shown in FIG. 3, light can be emitted in the illumination area in illumination patterns assigned to respective colours while displaying an image including a plurality of colours in the illumination area. In the example of FIG. 2, a different illumination pattern is assigned to the position of each pixel. On the other hand, in the example of FIG. 3, a different illumination pattern is assigned to each colour. With this configuration, each portion of an image can be notified to the vibration device 200 in the form of a difference in the illumination pattern. Thus, a tactile feedback corresponding to the colour of the image can be provided by the vibration device 200 notifying a user of the difference in the illumination pattern in the form of a difference in the vibration pattern.

As illustrated in FIGS. 2 and 3, according to the light-tactility conversion system 10, the light receiving position in pixel units, the colour of the image, or the like, can be instantly notified by light to the vibration device 200. That is, a time-lag due to the measurement of the receiving position or the like does not occur. Thus, a shape desired to be notified with extremely high accuracy can be swiftly and accurately notified to a user.

(Vibration Device 200)

Figure 4:
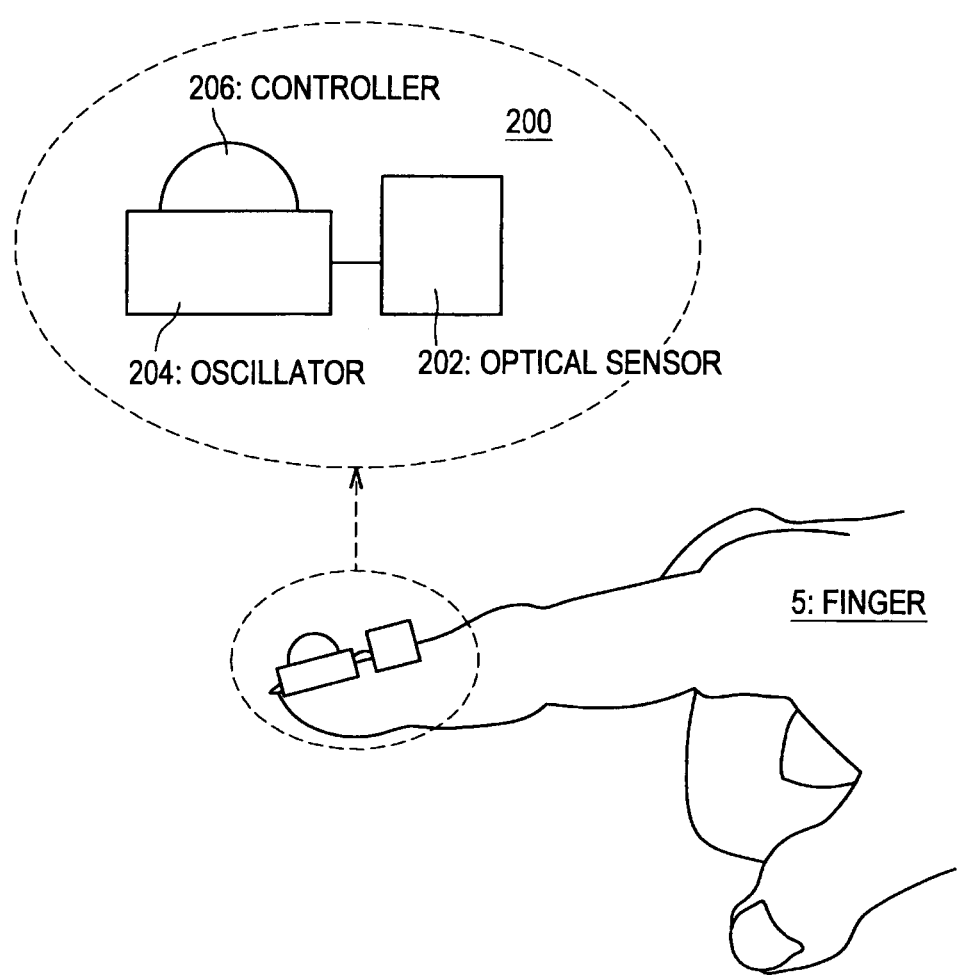
FIG. 4 is an explanatory diagram showing a device configuration example of a vibration device according to the present embodiment.

As described above, according to the light-tactility conversion system 10, position information or the like can be transferred by the projector 100 in pixel units. To make efficient use of this function, the light-tactility conversion system 10 uses the vibration device 200 which converts the illumination pattern to the vibration pattern. As shown in FIG. 4, the vibration device 200 includes an optical sensor 202, an oscillator 204, and a controller 206. The optical sensor 202 is means for detecting the intensity of received light. The function of the optical sensor 202 is realized by a photodiode or the like, for example. Data indicating the intensity of light detected by the optical sensor 202 is input to the controller 206.

Furthermore, the oscillator 204 is means for generating a vibration. The oscillator 204 is connected to the controller 206, and generates a vibration according to a drive signal input from the controller 206. The controller 206 is means for inputting the drive signal to the oscillator 204 and making the oscillator 204 vibrate. Additionally, the controller 206 inputs the drive signal to the oscillator 204 in synchronization with the illumination pattern of the received light, based on the data indicating the intensity of light input from the optical sensor 202. Thus, the oscillator 204 vibrates according to a vibration pattern substantially the same as the illumination pattern of light received by the optical sensor 202.

With this configuration, when the vibration device 200 enters the illumination area, a receiving position of light in the illumination area can be specified based on the illumination pattern. Additionally, as described above, the vibration device 200 performs the operation of transferring the vibration pattern to the user's finger 5 by directly converting the illumination pattern to the vibration pattern. Accordingly, a difference in the light receiving position is expressed as a difference in the vibration pattern felt by the user's finger 5. For example, as shown in FIG. 1, the user feels a first vibration pattern corresponding to the light L1 when the finger 5 enters the illumination area A1 from a non-illumination area A0. Thus, the user can perceive that the finger 5 is in the illumination area A1. Similarly, the user can perceive that the finger 5 is in the illumination area A2 by feeling a second vibration pattern corresponding to the light L2 when the finger 5 enters the illumination area A2 from the illumination area A1.

In this manner, by using the light-tactility conversion system 10 according to the present embodiment, it becomes possible to provide a tactile feedback in accordance with the light receiving position or the like with high accuracy (in pixel units) and at a high speed. Also, by projecting an image in the illumination pattern in accordance with the colour or the shape of the image, the user wearing the vibration device 200 is allowed to feel a natural sense of touch, as if he/she is actually touching the image with the finger 5. In the following, the technology according to the present embodiment will be described in detail.

(1-2: Vibration Pattern Generation Method)

First, referring to FIG. 5, a generation method for the vibration pattern according to the present embodiment will be described in detail. FIG. 5 is an explanatory diagram showing the generation method for the vibration pattern according to the present embodiment. As described above, the vibration device 200 generates a vibration by converting the illumination pattern to the vibration pattern. At this time, as shown in FIG. 5, the vibration device 200 according to the present embodiment generates a vibration pattern in synchronization with the illumination pattern of light received by the optical sensor 202. For example, the controller 206 transmits a drive signal to the oscillator 204 when the intensity of the received light is above a predetermined value, and stops the transmission of the drive signal when the intensity is below the predetermined value. The vibration pattern synchronized with the illumination pattern is obtained by the drive control as described of the oscillator 204 by the controller 206.

(1-3: Functional Configurations of Projector 100 and Vibration Device 200)

Figure 6:
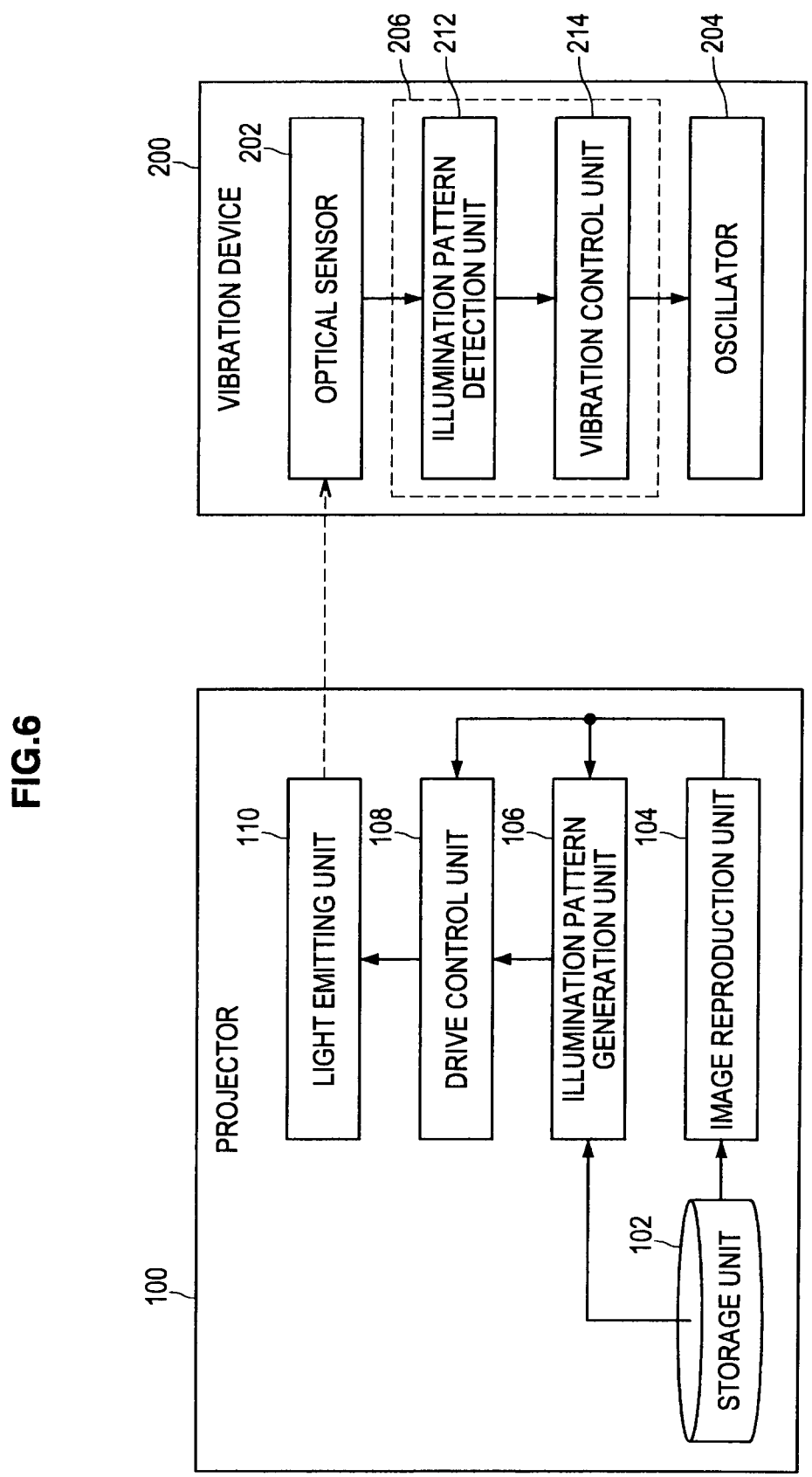
FIG. 6 is an explanatory diagram showing functional configuration examples of the projector and the vibration device according to the present embodiment.

Next, referring to FIG. 6, the functional configurations of the projector 100 and the vibration device 200 according to the present embodiment will be described in detail. FIG. 6 is an explanatory diagram showing functional configuration examples of the projector 100 and the vibration device 200 according to the present embodiment. For the sake of explanation, it is assumed that an illumination pattern is assigned to each colour as illustrated in FIG. 3.

(Projector 100)

First, the functional configuration of the projector 100 will be described. As shown in FIG. 6, the projector 100 includes a storage unit 102, an image reproduction unit 104, an illumination pattern generation unit 106, a drive control unit 108, and a light emitting unit 110. Additionally, the storage unit 102 stores image data and association information for associating the type of colour and a specific illumination pattern.

First, the image reproduction unit 104 reads image data from the storage unit 102. Then, the image reproduction unit 104 inputs information indicating the colour of each pixel included in the image data (hereinafter, "colour information") to the illumination pattern generation unit 106 and the drive control unit 108. The illumination pattern generation unit 106 reads the association information from the storage unit 102, and determines the illumination pattern for each pixel based on the colour information input from the image reproduction unit 104. The illumination pattern for each pixel determined by the illumination pattern generation unit 106 is input to the drive control unit 108.

The drive control unit 108 is means for controlling the driving by the light emitting unit 110. For example, when the projector 100 is a DLP projector, the drive control unit 108 controls the digital mirror device or the like provided in the light emitting unit 110, and makes the digital mirror device or the like illuminate the illumination area with the light of an illumination pattern determined for each pixel. Additionally, in case a colour wheel is provided to control the colours, the drive control unit 108 controls the movement of the colour wheel to express the colour of each pixel. Also, the drive control unit 108 controls the luminous intensity of the light source provided at the light emitting unit 110.

These controls are realized according to a control signal input from the drive control unit 108 to the light emitting unit 110. The light emitting unit 110 projects an image in the illumination area in the illumination patterns determined for respective pixels according to the control signal input from the drive control unit 108. As a result, as illustrated in FIG. 3, together with the projection of the image in the illumination area, light is emitted in the illumination area in the illumination patterns assigned to respective colours. For example, a pixel group of a colour #1 is illuminated with light of a first illumination pattern, and a pixel group of a colour #2 is illuminated with light of a second illumination pattern.

(Vibration Device 200)

Next, the functional configuration of the vibration device 200 will be described. As shown in FIG. 6, the vibration device 200 includes the optical sensor 202, the oscillator 204, and the controller 206. Also, the controller 206 includes an illumination pattern detection unit 212, and a vibration control unit 214.

The vibration device 200 receives by the optical sensor 202 the light emitted from the projector 100. The optical sensor 202 is means for detecting the intensity of the incident light. Information indicating the intensity of the light detected by the optical sensor 202 is input to the illumination pattern detection unit 212. The illumination pattern detection unit 212 detects the illumination pattern of the received light based on the information on the received light intensity input from the optical sensor 202. As described above, the light emitted from the projector 100 is assigned an illumination pattern for each colour. Thus, the illumination pattern detection unit 212 detects an illumination pattern corresponding to the colour of the image displayed in an illumination area in which the vibration device 200 is located at the time of receiving the light.

The illumination pattern detected by the illumination pattern detection unit 212 is input to the vibration control unit 214. The vibration control unit 214 transmits a drive signal for making the oscillator 204 vibrate in synchronization with the illumination pattern input by the illumination pattern detection unit 212. For example, the vibration control unit 214 transmits the drive signal to the oscillator 204 in case the amplitude of the illumination pattern is above a predetermined value. Also, the vibration control unit 214 stops the transmission of the drive signal in case the amplitude of the illumination pattern is below the predetermined value. When the drive signal is input from the vibration control unit 214, the oscillator 204 generates a vibration. Thus, a vibration is generated in synchronization with the illumination pattern.

In this manner, the vibration device 200 can generate a vibration in a vibration pattern substantially the same as the illumination pattern. Thus, when the illumination pattern of light received by the optical sensor 202 is different, a vibration of a different vibration pattern in accordance with the illumination pattern is generated. As described above, since light is emitted from the projector 100 with a different illumination pattern for each colour, a vibration of a different vibration pattern is generated when the vibration device 200 enters an illumination area of a different colour. As a result, a user is allowed to tactually identify the shape or the colour of an image displayed in the illumination area based on the change in the vibration pattern. Also, since position measurement using a mechanical structure is unnecessary, a tactile feedback can be generated accurately and at a high speed.

(1-4: Overall Flow of Feedback Generation Process)

Figure 7:
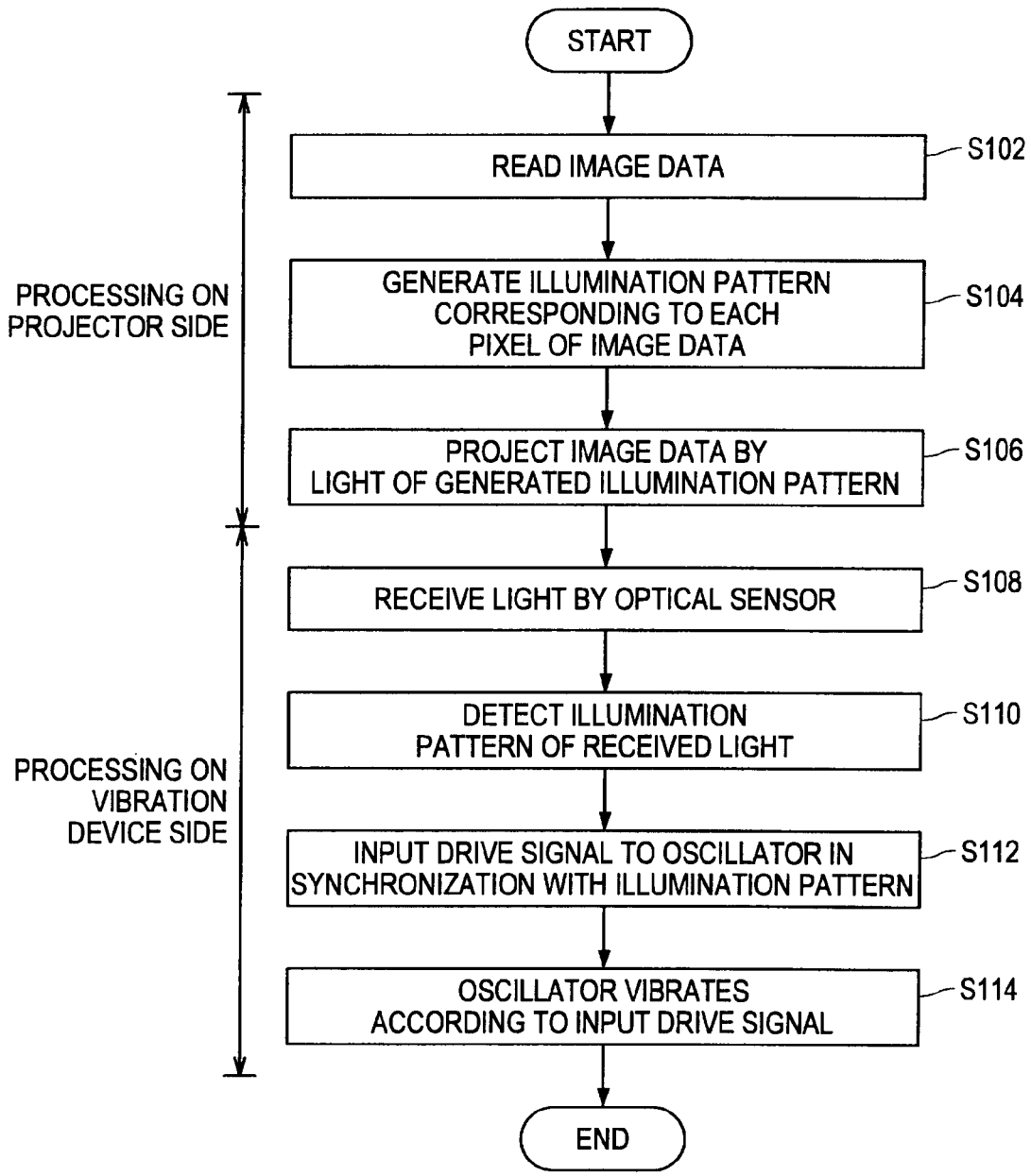
FIG. 7 is an explanatory diagram showing an example of a feedback generation method according to the present embodiment.

Next, referring to FIG. 7, an overall flow relating to a generation process for the tactile feedback according to the present embodiment will be described. FIG. 7 is an explanatory diagram showing the overall flow of the generation process for the tactile feedback according to the present embodiment.

As shown in FIG. 7, first, at the projector 100, image data is read by the image reproduction unit 104 from the storage unit 102 (S102). Then, information indicating the colour of each pixel corresponding to the image data is input from the image reproduction unit 104 to the illumination pattern generation unit 106 and the drive control unit 108. Next, an illumination pattern corresponding to the colour of each pixel is generated for each pixel by the illumination pattern generation unit 106 (S104). Then, information on the illumination pattern corresponding to each pixel is input from the illumination pattern generation unit 106 to the drive control unit 108. Next, on being subjected to the illumination control by the drive control unit 108, the image data is projected by the light emitting unit 110 (S106). Additionally, an illumination area corresponding to each pixel of the image data is illuminated with light having an illumination pattern generated for each pixel.

Next, at the vibration device 200, the light emitted from the projector 100 is received by the optical sensor 202 (S108). The light received at this time is the light emitted in an illumination pattern assigned to a pixel, according to the colour of each pixel. Thus, an illumination pattern is detected by the illumination pattern detection unit 212 from the light received by the optical sensor 202 (S110). Then, information on the illumination pattern detected by the illumination pattern detection unit 212 is input to the vibration control unit 214. Next, a drive signal is transmitted by the vibration control unit 214 based on the information on the illumination pattern at a timing synchronized with the illumination pattern and is input to the oscillator 204 (S112). Then, the oscillator 204 generates a vibration according to the input drive signal (S114).

With the vibration in accordance with the illumination pattern being notified to a user, a tactile feedback in accordance with the colour of each pixel configuring the image data is provided to the user. As a result, the user can identify the shape or the colour of the image displayed in the illumination area based on the tactile feedback. Also, since a position measurement using a mechanical structure is not performed, a tactile feedback can be generated accurately and at a high speed.

(1-5: Application Example)

Here, referring to FIGS. 8 to 10, an application example, a modified example or the like of the light-tactility conversion system 10 according to the present embodiment will be described. First, referring to FIG. 8, a modified example of the vibration device 200 will be described. Next, referring to FIG. 9, an application example of the light-tactility conversion system 10 will be described. Then, referring to FIG. 10, an application example providing a three-dimensional tactile feedback using a plurality of projectors 100 will be described.

(1-5-1: Modified Example of Vibration Device 200)

Figure 8:
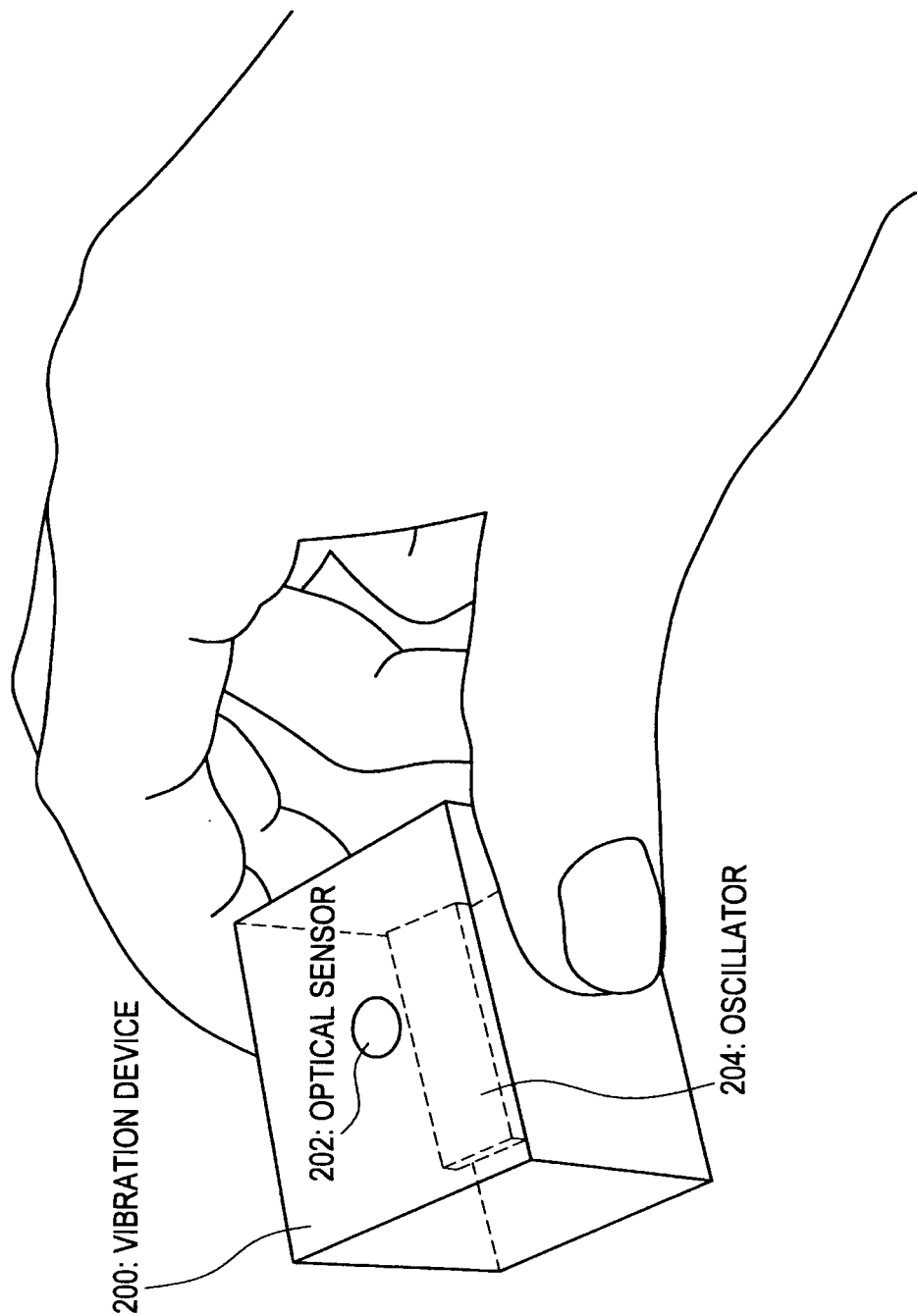
FIG. 8 is an explanatory diagram showing a modified example of the vibration device according to the present embodiment.

First, a reference is made to FIG. 8. Heretofore, a mode of using the vibration device 200 by attaching the same to the user's finger 5 has been described. However, the external configuration of the vibration device 200 is not limited to such. For example, as shown in FIG. 8, the optical sensor 202 and the oscillator 204 may be provided in a box-shaped housing. In this case, the controller 206 (not shown) is provided within the housing. Additionally, in case of adopting the mode illustrated in FIG. 8, each structural element can be provided in a freer manner, and thus, a plurality of optical sensors 202 can be provided or a controller 206 with high computing power and memory capacity can be provided. Additionally, the mode shown in FIG. 8 is an example, and as shown by the example, the external configuration of the vibration device 200 can be freely modified. For example, the vibration device 200 can be also formed in a card shape or a stick shape.

(1-5-2: Mode of Using Light-Tactility Conversion System 10)

Figure 9:
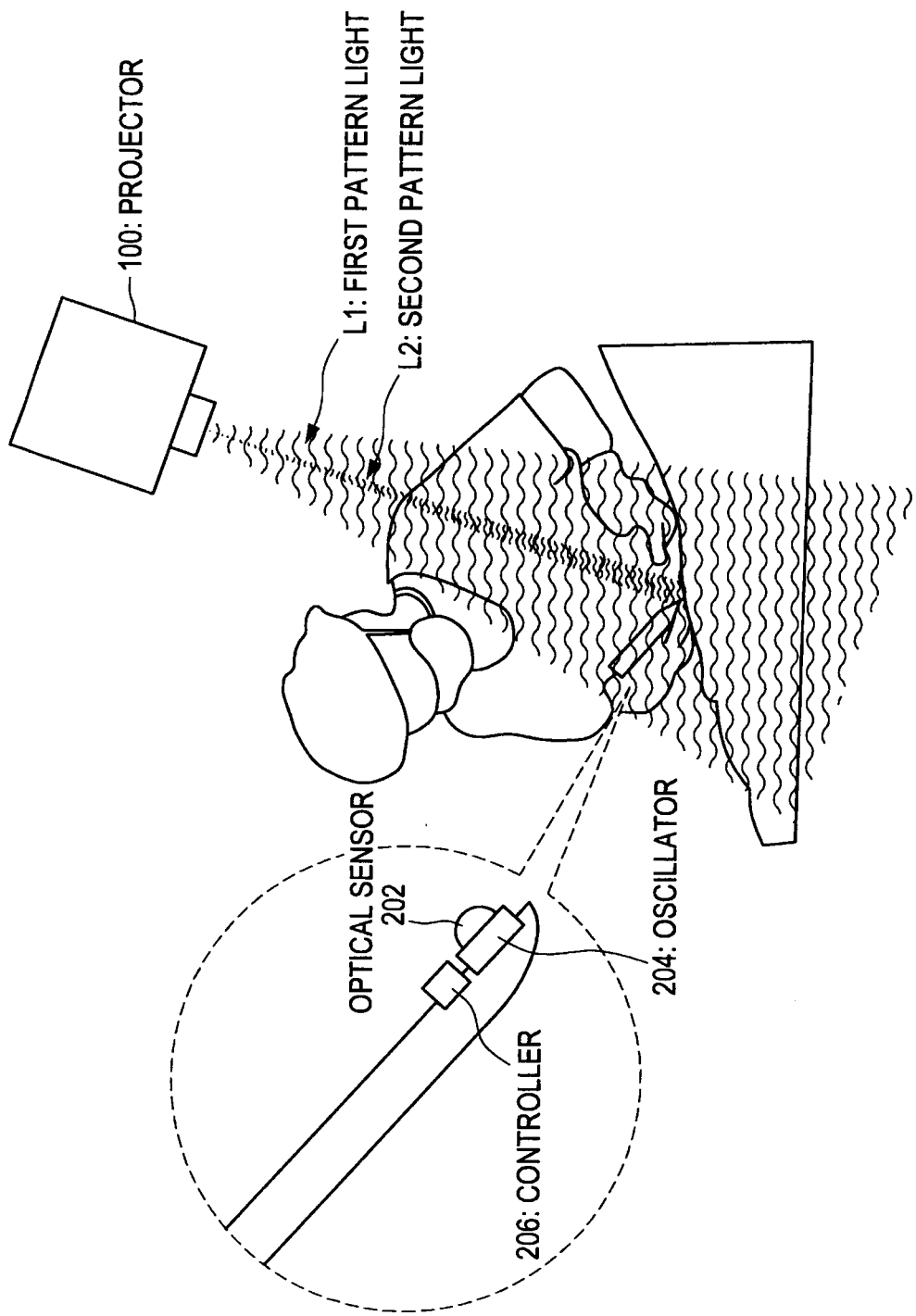
FIG. 9 is an explanatory diagram showing an application example of the light-tactility conversion system according to the present embodiment.

Next, a reference is made to FIG. 9. As described above, the external form of the vibration device 200 can be modified into various shapes. Thus, as shown in FIG. 9, a mode of using the vibration device 200 by attaching the same to a medical instrument can also be conceived. For example, the medical instrument to which the vibration device 200 will be attached is a surgical instrument such as a scalpel or a catheter. In case of using in a surgery, there is a utilization method of acquiring a three-dimensional shape of the inside of a body by a ultrasonic sensor and making one sense a path to be followed by a scalpel based on the acquired three-dimensional shape. By using this method, it becomes possible for a surgeon to perform a surgery while tactually feeling the path. Also, this utilization method can be applied to a remote surgery or the like.

Furthermore, in case of the light-tactility conversion system 10 according to the present embodiment, light of a different illumination pattern can be emitted for each pixel of a projected image. Thus, by controlling the optical system of the projector 100, the size of an illumination area can be reduced to a microscopic level. Accordingly, the light-tactility conversion system 10 according to the present embodiment can also be applied to aiding a work with a tactile feedback at the time of carrying out a precision work involving a microscopic size. In contrast, by increasing the size of the illumination area, the light-tactility conversion system 10 according to the present embodiment can also be applied to aid a work on a large work subject such as a building. It is also conceivable to realize an aid to the body movement of an athlete or the like by the tactile feedback. In this case, light is projected so as to cover the entire body of the athlete or the like.

Additionally, although one projector 100 has been assumed until now, the size of the illumination area can be increased by using a plurality of projectors 100 in parallel. Furthermore, in case of using a plurality of projectors 100, extension to three-dimensions becomes possible. In the following, a method of extending to three-dimensions by using a plurality of projectors 100 will be described.

(1-5-3: Modified Example of Projector 100 (Extension to Three-Dimensions))

Heretofore, an explanation has been made on a configuration of emitting light of an illumination pattern different for each pixel of a projected image while projecting the image on a two-dimensional plane by using one projector 100. In case of this configuration, a position on the two-dimensional plane can be expressed by the illumination pattern. Also, the difference between the colours of respective pixels of the two-dimensional projected image can be expressed by the illumination patterns. However, a refinement should be made when a three-dimensional virtual object is assumed and a tactile feedback of touching the virtual object is to be provided. That is, there is an issue of how to express three-dimensional spatial coordinates by the difference in the illumination patterns.

Figure 10:
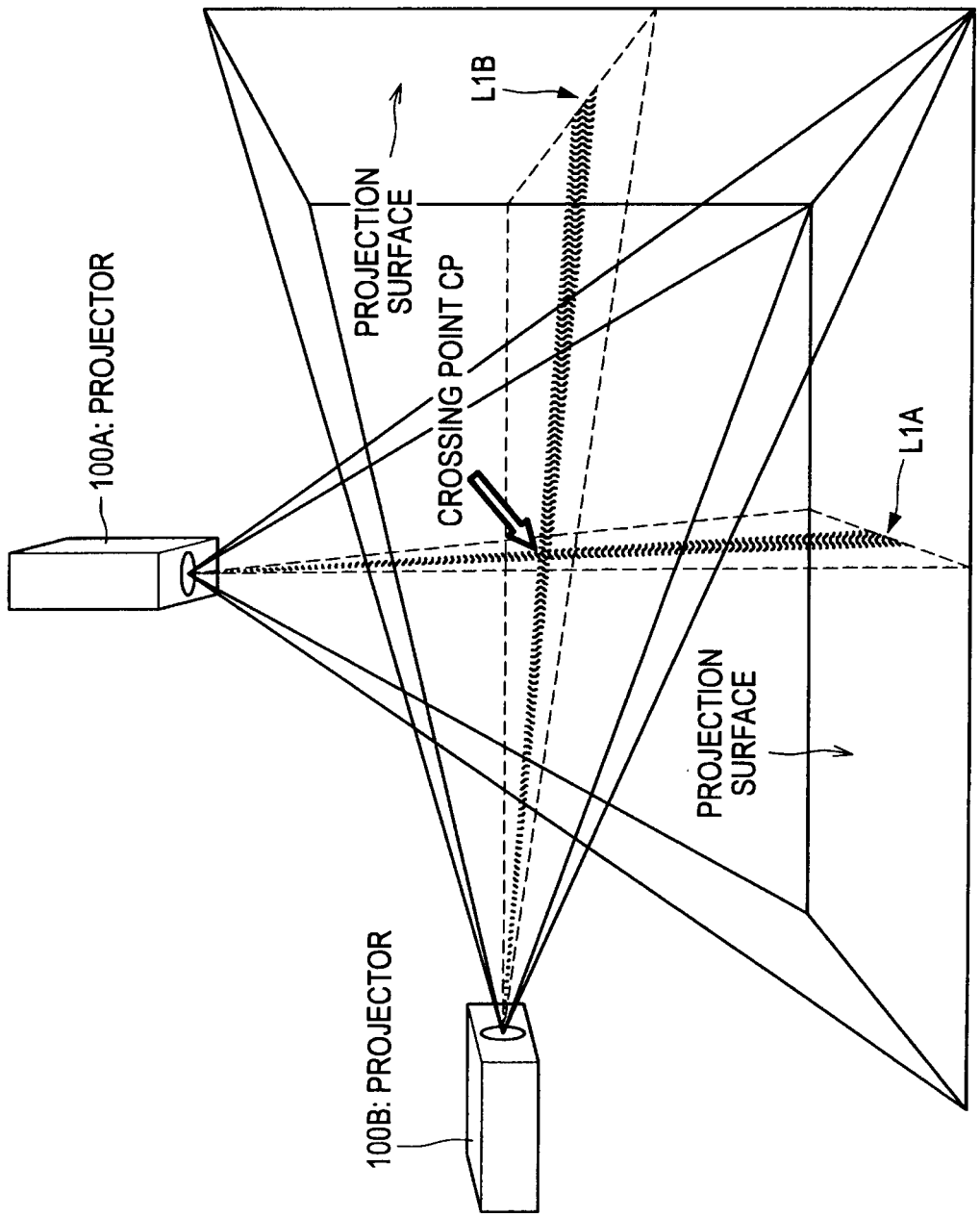
FIG. 10 is an explanatory diagram showing an application example of the light-tactility conversion system according to the present embodiment.

In view of this issue, a method can be conceived of using two projectors 100A and 100B as shown in FIG. 10, for example. Additionally, the projectors 100A and 100B have substantially the same functional configuration as the above-described projector 100. Also, light emitting directions of the projectors 100A and 100B are different from each other. With this configuration, a three-dimensional position can be specified by using the light emitted from the projector 100A and the light emitted from the projector 100B. For example, a crossing point CP of light L1A of a first pattern emitted from the projector 100A and light L1B of a first pattern emitted from the projector 100B is specified by a combination of the illumination pattern of the light L1A and the illumination pattern of the light L1B.

Additionally, in case of extending to three-dimensions as described, the vibration device 200 has to have a structure for receiving each of the light emitted from the projectors 100A and 100B. Also, a structure for detecting each of the illumination patterns of the light emitted from the projectors 100A and 100B and for generating a vibration pattern in accordance with the combination of the illumination patterns also becomes necessary at the vibration device 200. For example, with regard to this issue, it is desired to provide a plurality of optical sensors 202 or illumination pattern detection units 212 in the functional configuration shown in FIG. 6 or to refine the function of the vibration control unit 214. For example, the function of the vibration control unit 214 is changed so as to make the oscillator 204 vibrate at a timing synchronized with one of the illumination patterns and with a vibration intensity according to the amplitude of the other illumination pattern.

Also, changing to a vibration control method using a code book as in the second embodiment described later will be performed.

As described above, the light-tactility conversion system 10 notifies, by light, the position at which the tactile feedback is to be generated. Thus, a resolution capable of providing different vibrations can be freely changed to various levels as described above. Also, information on position or the like is transferred from the side of the projector 100 to the vibration device at an extremely high speed. As a result, a delay occurring in a method of detecting the position of an operating tool or the like by a mechanical structure or the like does not occur. As described, by applying the technology according to the present embodiment, a tactile feedback based on a high-speed and highly accurate position sensing is provided, and various modes for using are realized in wide range of fields.

Heretofore, the first embodiment of the present invention has been described. The present embodiment relates to the method of using an illumination pattern as a drive signal for the oscillator 204 and generating a vibration in a vibration pattern synchronized with the illumination pattern. According to this method, the vibration patterns are limited by the restriction of the structure of the projector 100 for controlling the blinking of light. Thus, in the second embodiment described below, a configuration allowing the generation of more complicated vibration patterns will be described. Additionally, in case of realizing a tactile feedback by a combination of simple vibration patterns, the method according to the first embodiment described above is enough. Also, this method contributes to the miniaturization of the vibration device 200 or lowering of the cost because the structure of the vibration device 200 can be made simple.

<2: Second Embodiment>

Next, the second embodiment of the present invention will be described. The present embodiment relates to a method of providing a tactile feedback different for each illumination area by emitting light in an illumination pattern different for each illumination area and by receiving the emitted light by an optical sensor and converting the same to a vibration pattern. Particularly, the present embodiment relates to a method of interpreting the waveform of the illumination pattern as a specific code and providing a vibration of a vibration pattern corresponding to the code.

(2-1: Vibration Pattern Generation Method)

First, referring to FIG. 11, an outline of a generation method for a vibration pattern according to the present embodiment will be described. FIG. 11 is an explanatory diagram showing a generation method for a vibration pattern according to the present embodiment. As described above, the vibration device 200 generates a vibration by converting an illumination pattern to a vibration pattern. At this time, as shown in FIG. 11, the vibration device 200 according to the present embodiment interprets the illumination pattern of light received by the optical sensor 202 as a specific code (1101001). Also, the vibration device 200 refers to a code book associating specific codes and vibration patterns and generates a vibration pattern corresponding to the specific code obtained from the illumination pattern. For example, a vibration of a frequency of 100 Hz is generated during the time of receiving light of the illumination pattern corresponding to the code 1101001. With this configuration, a frequency of blinking of light and a vibration frequency can be controlled regardless of each other.

(2-2: Functional Configurations of Projector 100 and Vibration Device 200)

Figure 12:
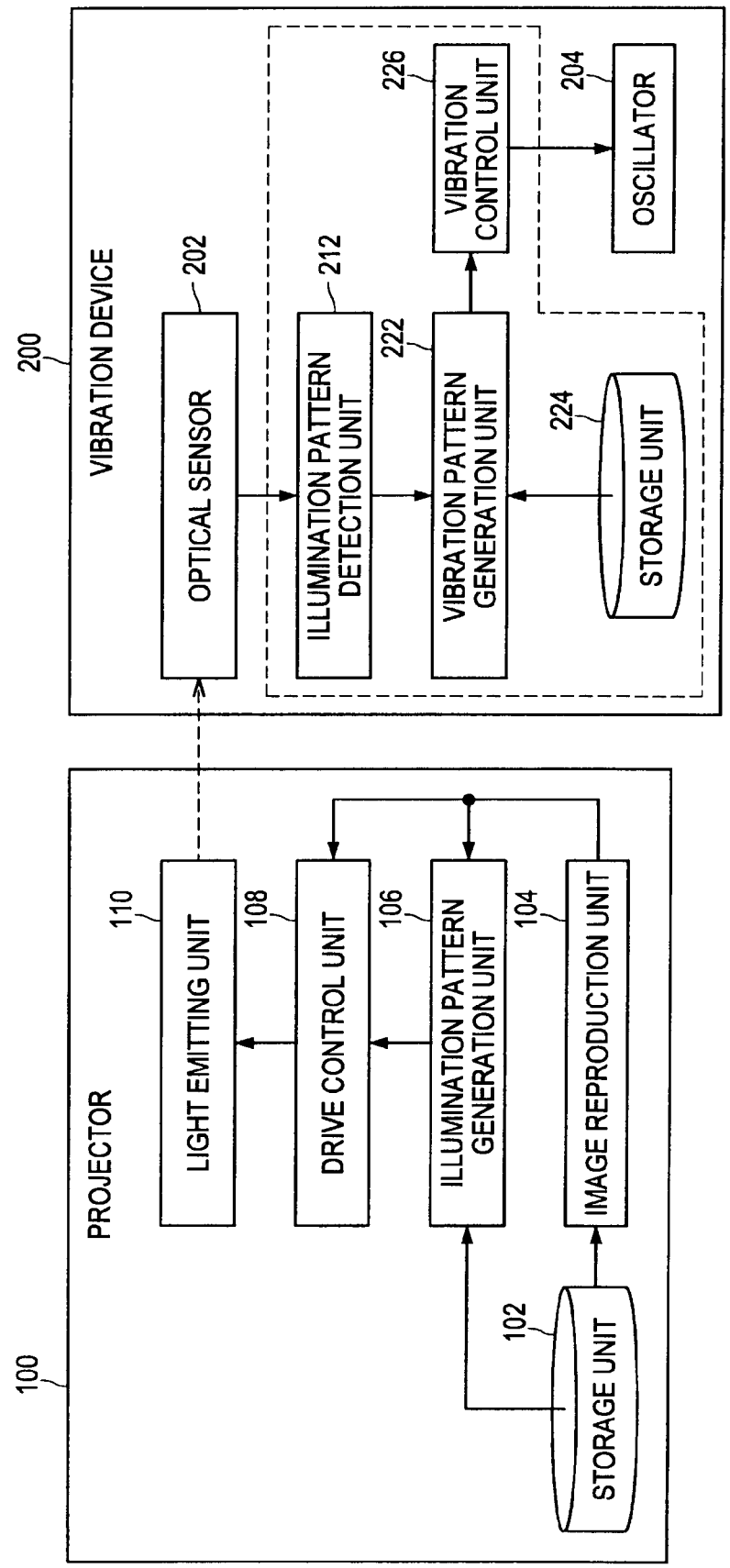
FIG. 12 is an explanatory diagram showing functional configuration examples of a projector and a vibration device according to the present embodiment.

Next, referring to FIG. 12, the functional configurations of the projector 100 and the vibration device 200 according to the present embodiment will be described in detail. FIG. 12 is an explanatory diagram showing the functional configuration examples of the projector 100 and the vibration device 200 according to the present embodiment. Additionally, for the sake of explanation, it is assumed that an illumination pattern is assigned to each colour as illustrated in FIG. 3.

(Projector 100)

First, the functional configuration of the projector 100 will be described. As shown in FIG. 12, the projector 100 includes the storage unit 102, the image reproduction unit 104, the illumination pattern generation unit 106, the drive control unit 108, and the light emitting unit 110. Additionally, the storage unit 102 stores image data and association information for associating the type of colour and a specific illumination pattern.

First, the image reproduction unit 104 reads image data from the storage unit 102. Then, the image reproduction unit 104 inputs information indicating the colour of each pixel included in the image data (hereinafter, "colour information") to the illumination pattern generation unit 106 and the drive control unit 108. The illumination pattern generation unit 106 reads the association information from the storage unit 102, and determines the illumination pattern for each pixel based on the colour information input from the image reproduction unit 104. The illumination pattern for each pixel determined by the illumination pattern generation unit 106 is input to the drive control unit 108. Additionally, unlike the first embodiment described above, the waveform of an illumination pattern is not directly converted to the waveform of a vibration pattern. Thus, the illumination pattern generation unit 106 determines a specific code corresponding to the input colour information and inputs to the drive control unit 108 a specific illumination pattern corresponding to the specific code.

The drive control unit 108 is means for controlling the driving by the light emitting unit 110. For example, when the projector 100 is a DLP projector, the drive control unit 108 controls the digital mirror device or the like provided in the light emitting unit 110, and makes the digital mirror device or the like illuminate the illumination area with the light of an illumination pattern determined for each pixel. Additionally, in case a colour wheel is provided to control the colours, the drive control unit 108 controls the movement of the colour wheel to express the colour of each pixel. Also, the drive control unit 108 controls the luminous intensity of the light source provided at the light emitting unit 110. As described above, according to the present embodiment, since light does not have to be emitted in an illumination pattern having a waveform same as the waveform of a vibration pattern, the load on the drive control unit 108 and the light emitting unit 110 can be made small even in a case of providing a vibration pattern of a high frequency, for example.

(Vibration Device 200)

Next, the functional configuration of the vibration device 200 will be described. As shown in FIG. 12, the vibration device 200 includes the optical sensor 202, the oscillator 204, and the controller 206. Also, the controller 206 includes the illumination pattern detection unit 212, a vibration pattern generation unit 222, a storage unit 224, and a vibration control unit 226. The storage unit 224 stores an illumination pattern code book associating illumination patterns and codes, and a vibration pattern code book associating codes and vibration patterns.

The vibration device 200 receives by the optical sensor 202 the light emitted from the projector 100. The optical sensor 202 is means for detecting the intensity of the incident light. Information indicating the intensity of the light detected by the optical sensor 202 is input to the illumination pattern detection unit 212. The illumination pattern detection unit 212 detects the illumination pattern of the received light based on the information on the received light intensity input from the optical sensor 202. As described above, the light emitted from the projector 100 is assigned an illumination pattern corresponding to a specific code, with regard to each colour. Thus, the illumination pattern detection unit 212 detects an illumination pattern indicating a specific code corresponding to the colour of the image displayed in an illumination area in which the vibration device 200 is located at the time of receiving the light.

The illumination pattern detected by the illumination pattern detection unit 212 is input to the vibration pattern generation unit 222. The vibration pattern generation unit 222 refers to the illumination pattern code book stored in the storage unit 224 and determines a specific code corresponding to the input illumination pattern. Furthermore, the vibration pattern generation unit 222 refers to the vibration pattern code book and generates a vibration pattern corresponding to the determined specific code. Information on the vibration pattern generated by the vibration pattern generation unit 222 is input to the vibration control unit 226. The vibration control unit 226 transmits a drive signal for making the oscillator 204 vibrate based on the vibration pattern generated by the vibration pattern generation unit 222. When the drive signal is input from the vibration control unit 214, the oscillator 204 generates a vibration. As a result, a vibration pattern corresponding to a specific code is generated.

In this manner, the vibration device 200 can generate a vibration of a vibration pattern corresponding to a specific code assigned to each colour. Furthermore, since the illumination pattern is converted to the vibration pattern through a specific code, an excessive load is not applied to the projector 100 at the time of generating a complicated vibration pattern or a vibration pattern of vibrating at a high-frequency. Also, in case of extending to three-dimensions as shown in FIG. 10, a vibration pattern can be generated from the combination of codes, in the form of the illumination patterns, received from the two projectors 100A and 100B, and a more complicated tactile feedback can be provided.

(2-3: Overall Flow of Feedback Generation Process)

Figure 13:
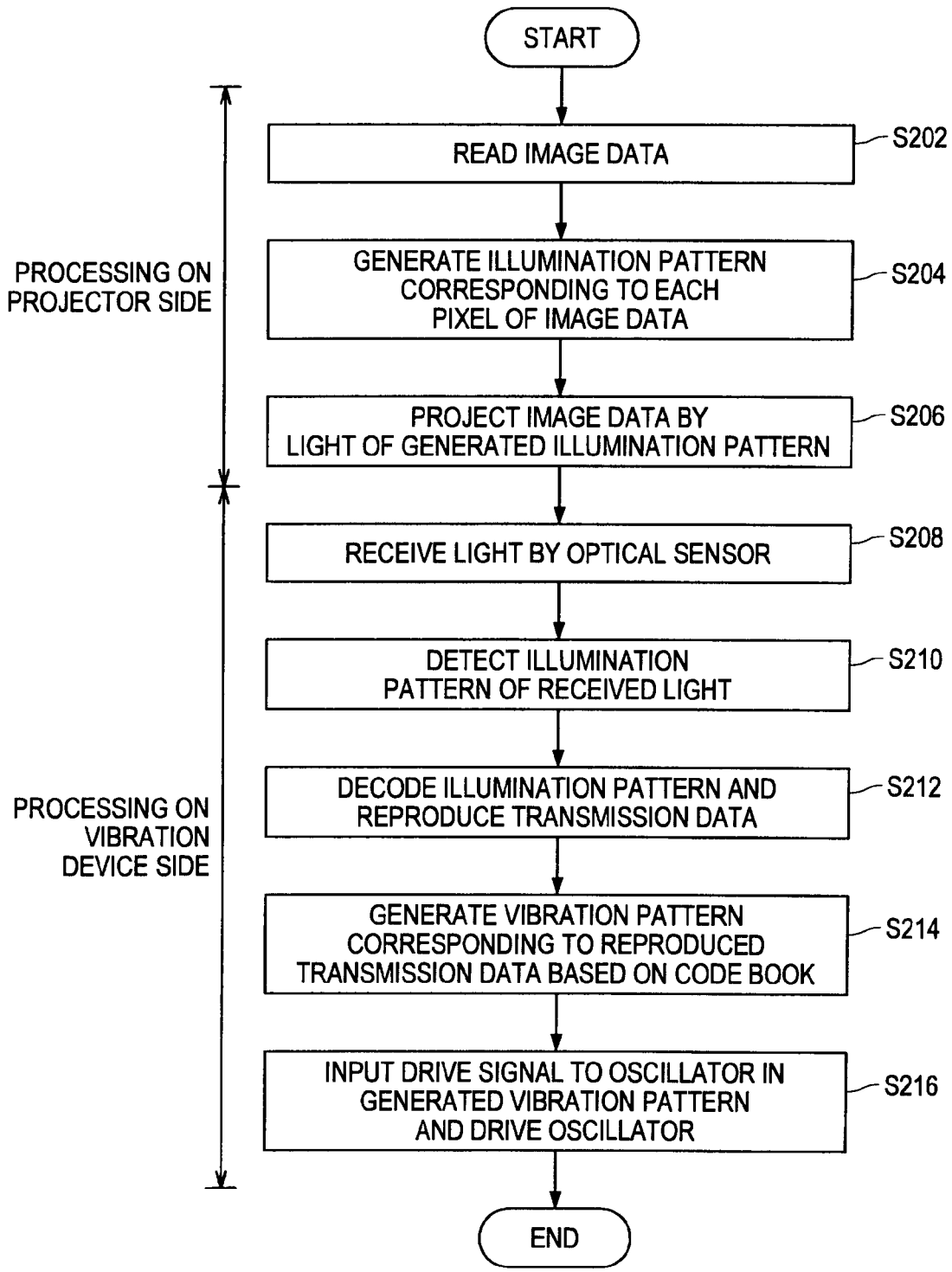
FIG. 13 is an explanatory diagram showing an example of a feedback generation method according to the present embodiment.

Next, referring to FIG. 13, an overall flow relating to a generation process for the tactile feedback according to the present embodiment will be described. FIG. 13 is an explanatory diagram showing the overall flow of the generation process for the tactile feedback according to the present embodiment.

As shown in FIG. 13, first, at the projector 100, image data is read by the image reproduction unit 104 from the storage unit 102 (S202). Then, information indicating the colour of each pixel corresponding to the image data is input from the image reproduction unit 104 to the illumination pattern generation unit 106 and the drive control unit 108. Next, an illumination pattern indicating a specific code corresponding to the colour of each pixel is generated for each pixel by the illumination pattern generation unit 106 (S204). Then, information on the illumination pattern corresponding to each pixel is input from the illumination pattern generation unit 106 to the drive control unit 108. Next, on being subjected to the illumination control by the drive control unit 108, the image data is projected by the light emitting unit 110 (S206). Additionally, an illumination area corresponding to each pixel of the image data is illuminated with light having an illumination pattern generated for each pixel.

Next, at the vibration device 200, the light emitted from the projector 100 is received by the optical sensor 202 (S208). The light received at this time is the light emitted in an illumination pattern indicating a specific code assigned to a pixel, according to the colour of each pixel. Thus, an illumination pattern is detected by the illumination pattern detection unit 212 from the light received by the optical sensor 202 (S210). Then, information on the illumination pattern detected by the illumination pattern detection unit 212 is input to the vibration pattern generation unit 222.

At the vibration pattern generation unit 222, a specific code is regenerated from the illumination pattern based on the illumination pattern code book stored in the storage unit 224. Also, a vibration pattern is generated from the specific code based on the vibration pattern code book stored in the storage unit 224. Information on the vibration pattern generated by the vibration pattern generation unit 222 is input to the vibration control unit 226. Then, a drive signal is transmitted by the vibration control unit 226 in the vibration pattern generated by the vibration pattern generation unit 222, the oscillator 204 vibrates according to the drive signal, and a tactile feedback is provided to a user (S216).

In this manner, with a code assigned to each colour being notified through an illumination pattern and a vibration in accordance with the code being notified to a user, a tactile feedback corresponding to the colour of each pixel configuring the image data is provided to the user. As a result, the user can identify the shape or the colour of the image displayed in the illumination area based on the tactile feedback. Also, since position measurement using a mechanical structure is not performed, a tactile feedback can be generated accurately and at a high speed.

<3: Third Embodiment>

Next, the third embodiment of the present invention will be described. The present embodiment relates to a method of providing a tactile feedback different for each illumination area by emitting light in an illumination pattern different for each illumination area, and receiving the emitted light by an optical sensor and converting the same to a vibration pattern according to the position. Particularly, the present embodiment relates to a method of transferring as an illumination pattern position information of an illumination area, and generating a vibration pattern based on the position information detected from the illumination pattern of received light and on projected image data. That is, in the first and second embodiments described above, a vibration pattern is directly or indirectly controlled at the projector 100. However, the projector 100 according to the present embodiment does not control the vibration pattern.

(3-1: Vibration Pattern Generation Method)

Figure 14:
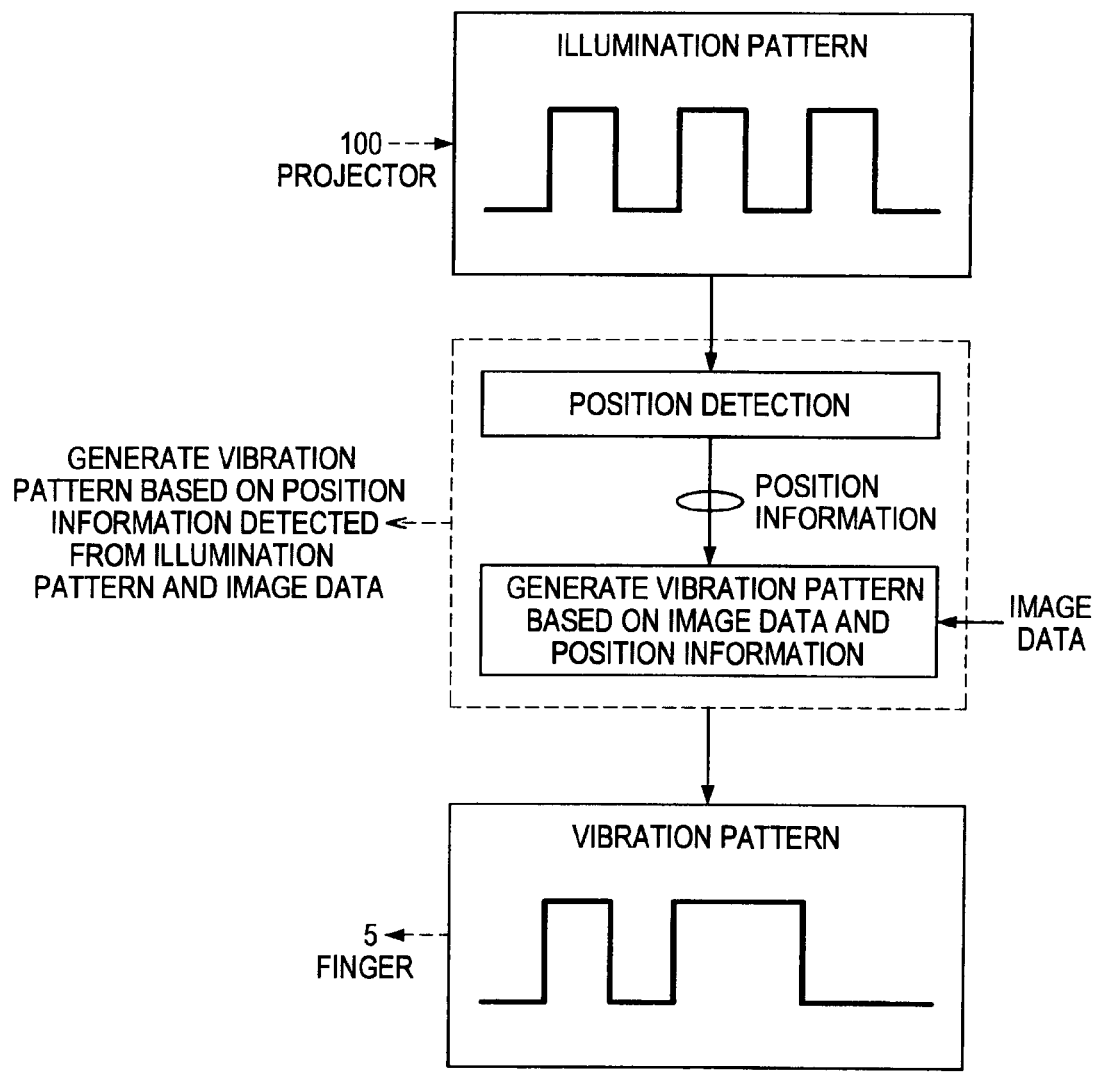
FIG. 14 is an explanatory diagram showing a vibration pattern generation method according to a third embodiment of the present invention.

First, referring to FIG. 14, an outline of a generation method for a vibration pattern according to the present embodiment will be described. FIG. 14 is an explanatory diagram showing a generation method for a vibration pattern according to the present embodiment. As shown in FIG. 14, the vibration device 200 according to the present embodiment detects the position information from the illumination pattern of the light received by the optical sensor 202. Thus, an illumination pattern (or a specific code) is assigned in advance to each pixel forming a projected image and the position of each pixel is made specifiable in advance from the illumination pattern. When light emitted in a specific illumination pattern as described is received by the vibration device 200, the vibration device 200 detects the position within the projected image from the illumination pattern of the received light. Furthermore, based on the image data of the projected image, the vibration device 200 identifies the colour of the pixel at the detected position and generates a vibration pattern corresponding to the colour. With this configuration, the sense of touch corresponding to the colour of each pixel can be provided to the user.

(3-2: Functional Configurations of Projector 100 and Vibration Device 200)

Next, referring to FIG. 15, the functional configurations of the projector 100 and the vibration device 200 according to the present embodiment will be described in detail. FIG. 15 is an explanatory diagram showing functional configuration examples of the projector 100 and the vibration device 200 according to the present embodiment. Additionally, for the sake of explanation, it is assumed that an illumination pattern is assigned to each colour as illustrated in FIG. 3.

(Projector 100)

First, the function configuration of the projector 100 will be described. As shown in FIG. 15, the projector 100 includes the drive control unit 108 and the light emitting unit 110. Additionally, it is assumed that information on a specific illumination pattern corresponding to the position of each pixel forming a projected image is input to the drive control unit 108.

Like the first and second embodiments described above, the drive control unit 108 is means for controlling the driving by the light emitting unit 110. For example, when the projector 100 is a DLP projector, the drive control unit 108 controls the digital mirror device or the like provided in the light emitting unit 110, and makes the digital mirror device or the like illuminate the illumination area with the light of an illumination pattern determined for each pixel. Additionally, in case a colour wheel is provided to control the colours, the drive control unit 108 controls the movement of the colour wheel to express the colour of each pixel. Also, the drive control unit 108 controls the luminous intensity of the light source provided at the light emitting unit 110. However, the drive control unit 108 of the present embodiment controls the light emitting unit 110 in such a way that light is emitted in an illumination pattern for each pixel that is set in advance. Accordingly, the drive control unit 108 does not control the illumination pattern according to image data.

(Vibration Device 200)

Next, the functional configuration of the vibration device 200 will be described. As shown in FIG. 15, the vibration device 200 includes the optical sensor 202, the oscillator 204, and the controller 206. Also, the controller 206 includes the illumination pattern detection unit 212, a position detection unit 232, a vibration pattern generation unit 234, a communication unit 236, a storage unit 238, and a vibration control unit 240. Additionally, image data of an image to be projected by the projector 100 is input to the communication unit 236 through a specific communication path. Furthermore, the storage unit 224 stores colour/vibration-pattern correspondence information indicating the correspondence relationship between colour and vibration pattern.

The vibration device 200 receives by the optical sensor 202 the light emitted from the projector 100. The optical sensor 202 is means for detecting the intensity of the incident light. Information indicating the intensity of the light detected by the optical sensor 202 is input to the illumination pattern detection unit 212. The illumination pattern detection unit 212 detects the illumination pattern of the received light based on the information on the received light intensity input from the optical sensor 202. The illumination pattern detected by the illumination pattern detection unit 212 is input to the position detection unit 232. As described above, each illumination pattern is associated with the position of each pixel forming the projected image. Thus, the position detection unit 232 detects the position within the projected image based on the form of the illumination pattern. Information on the position detected by the position detection unit 232 is input to the vibration pattern generation unit 234.

The image data received by the communication unit 236 and the information on the position detected by the position detection unit 232 are input to the vibration pattern generation unit 234. First, the vibration pattern generation unit 234 specifies a pixel in the image data corresponding to the position information and detects the colour of the pixel. Then, the vibration pattern generation unit 234 refers to the colour/vibration-pattern correspondence information stored in the storage unit 238 and generates a vibration pattern corresponding to the detected colour. The vibration pattern generated by the vibration pattern generation unit 234 is input to the vibration control unit 240. The vibration control unit 240 transmits a drive signal based on the vibration pattern generated by the vibration pattern generation unit 234 and makes the oscillator 204 vibrate. As a result, a tactile feedback corresponding to the design or the colour of the projected image is provided to a user.

In this manner, the vibration device 200 can perform a position detection based on the illumination pattern of light emitted by the projector 100 and generate a vibration in a vibration pattern assigned to each colour. Furthermore, in case of extending to three-dimensions as shown in FIG. 10, the vibration device 200 can detect a three-dimensional position based on the illumination patterns of light emitted from the two projectors 100A and 100B. Thus, a sense of touch can be provided to a user in a vibration pattern corresponding to each position of a virtual three-dimensional cubic image.

(3-3: Overall Flow of Feedback Generation Process)

Next, referring to FIG. 16, an overall flow relating to a generation process for the tactile feedback according to the present embodiment will be described. FIG. 16 is an explanatory diagram showing the overall flow of the generation process for the tactile feedback according to the present embodiment.

As shown in FIG. 16, first, at the projector 100, image data is projected by the light emitting unit 110 that is subjected to the illumination control by the drive control unit 108 (S302). Additionally, an illumination area corresponding to each pixel of the image data is illuminated with light having a specific illumination pattern assigned in advance to each pixel. Next, at the vibration device 200, the light emitted from the projector 100 is received by the optical sensor 202 (S304). Then, the illumination pattern is detected by the illumination pattern detection unit 212 from the light received by the optical sensor 202 (S306). Then, information on the illumination pattern detected by the illumination pattern detection unit 212 is input to the position detection unit 232.

Next, a position within the projected image is detected by the position detection unit 232 from the input illumination pattern (S308). Then, information on the position detected by the position detection unit 232 is input to the vibration pattern generation unit 234. Next, a vibration pattern is generated by the vibration pattern generation unit 234 based on the image data obtained via the communication unit 236 and the information on the position detected by the position detection unit 232 (S310). At this time, the vibration pattern generation unit 234 specifies a pixel in the image data indicated by the position information and identifies the colour of the pixel. After that, the vibration pattern generation unit 234 refers to the colour/vibration-pattern correspondence information stored in the storage unit 238 and generates a vibration pattern corresponding to the identified colour.

Information on the vibration pattern generated by the vibration pattern generation unit 234 is input to the vibration control unit 240. Then, a drive signal is transmitted by the vibration control unit 240 in the vibration pattern input from the vibration pattern generation unit 234, the oscillator 204 vibrates according to the drive signal, and a tactile feedback is provided to a user (S312).

In this manner, position information indicating the position within the projected image is notified through an illumination pattern, the colour of the pixel indicated by the position information is identified, and a vibration pattern in accordance with the colour is notified to a user. With this configuration, a user can identify the shape or the colour of an image displayed in an illumination area based on a tactile feedback. Also, since position measurement using a mechanical structure is not performed, a tactile feedback can be generated accurately and at a high speed.

<4: Conclusion>

Lastly, the functional configuration of the light-tactility conversion system according to each of the above-described embodiments, and the effects obtained by the functional configuration will be briefly described.

First, the functional configuration of the light-tactility conversion system according to the present embodiment can be expressed as follows. The light-tactility conversion system is configured from a light emitting device and a vibration device. Additionally, the function of the light emitting device can be realized by the above-described projector 100. Also, the function of the vibration device can be realized by the above-described vibration device 200.

Furthermore, the light emitting device mentioned above includes an illumination unit and an illumination control unit as described below. The illumination unit can emit light at the same time to a plurality of illumination areas in different illumination patterns. For example, as with the above-described projector 100, the illumination unit can emit light in an illumination pattern different for each pixel of a projected image. Furthermore, the illumination control unit mentioned above is for controlling the illumination unit and making the illumination unit project an image, and also for controlling the illumination patterns in units of pixels of the projected image and making the illumination unit emit light to specific illumination areas in specific illumination patterns. With this configuration, light of a specific illumination pattern is emitted to a specific illumination area.

Furthermore, the above-described vibration device includes an illumination pattern detection unit and a vibration control unit as described below. The illumination pattern detection unit is for detecting an illumination pattern of light received from the light emitting device. Also, the vibration control unit is for generating a vibration pattern corresponding to the illumination pattern detected by the illumination pattern detection unit and vibrating an oscillator in the vibration pattern. As described above, light of a specific illumination pattern is emitted to a specific illumination area. Thus, when the vibration device enters the specific illumination area, it receives the light of the specific pattern. Then, the above-described vibration device detects, by the illumination pattern detection unit, the illumination pattern of the received light, and makes the oscillator vibrate in a vibration pattern corresponding to the illumination pattern. With this configuration, a user who sensed the vibration pattern of the oscillator is allowed to perceive based on the type of the vibration pattern that the vibration device is in the specific illumination area.

Furthermore, the vibration control unit may be configured to transmit a drive signal for vibrating the oscillator by a specific vibration amount, in synchronization with the illumination pattern detected by the illumination pattern detection unit. With this configuration, the oscillator can be made to vibrate in a vibration pattern of a waveform substantially the same as the waveform of the illumination pattern. That is, the vibration pattern can be controlled on the side of the light emitting device. Thus, a circuit or the like for controlling the vibration pattern becomes unnecessary on the side of the vibration device, and the vibration device can be miniaturized. Also, simplifying the device configuration of the vibration device will contribute to the reduction in the cost and weight of the vibration device.

Furthermore, the illumination control unit may be configured to control, by using a specific illumination pattern indicating a specific code, the illumination unit to emit light to a specific illumination area in the specific illumination pattern. In this case, the vibration control unit is configured to regenerate the specific code corresponding to the illumination pattern detected by the illumination pattern detection unit, and to vibrate the oscillator in a specific vibration pattern corresponding to the specific code.

As described, by transferring a specific code by using the illumination pattern and generating a vibration pattern based on the code, the form or the characteristics of the vibration pattern becomes free from the restrictions of the illumination structure of the light emitting device. For example, generation of a vibration pattern of an extremely high or low frequency or generation of a complicated vibration pattern may not be realized depending on the capabilities of the illumination structure of the light emitting device. However, application of the configuration described above and utilization of a specific code will cause the waveform of the illumination pattern and the waveform of the vibration pattern to be not directly associated with each other, and thus, it becomes possible to set the vibration pattern regardless of the capabilities of the light emitting device.

Furthermore, the illumination control unit may be configured to make light emitted in a specific pattern different for each colour, according to the colour of each pixel of the projected image. With this configuration, the sense of touching a projected image felt by a user can be fed back by a vibration. For example, keys of a piano may be displayed as a projected image, and when a user touches the keys, sense of touch different for each pitch may be provided. Additionally, sound or visual effect may be provided together with the sense of touch.

Furthermore, the light emitting device may include first and second illumination units with different light emitting directions. In this case, the illumination control unit controls the first and second illumination units and makes the first and second illumination units emit light to specific target areas in specific illumination patterns. Also, the illumination pattern detection unit detects each of the illumination patterns of the light emitted from the first and second illumination units included in the light emitting device. Furthermore, the vibration control unit makes the oscillator vibrate in a vibration pattern associated in advance with a combination of the illumination pattern of the light emitted from the first illumination unit and the illumination pattern of the light emitted from the second illumination unit. With this configuration, a tactile feedback can be generated with a virtual three-dimensional image as the target.

Furthermore, the illumination control unit may be configured to control the first and second illumination units, and, by using specific illumination patterns indicating specific codes, make the first and second illumination units emit light to specific illumination areas in the specific illumination patterns. In this case, the vibration control unit regenerates each of the specific codes corresponding to the respective illumination patterns of light emitted from the first and second illumination units, the illumination patterns being detected by the illumination pattern detection unit, and vibrates the oscillator in a specific vibration pattern corresponding to a combination of the specific codes. With this configuration, a more complicated vibration pattern can be generated at the time of generating a tactile feedback with a virtual three-dimensional image as the target.

Furthermore, the illumination unit may include a light source for emitting light, a plurality of mirrors provided for each pixel of the projected image, the plurality of mirrors being capable of guiding the light emitted from the light source to a lens, and a mirror control unit for controlling the angle of each mirror. In this case, the mirror control unit controls the illumination patterns in units of pixels of the projected image by changing the angle of each mirror according to a control by the illumination control unit. By using the light emitting device having such device configuration, the illumination pattern can be controlled in units of pixels of a projected image.

(Remarks)

The above-described projector 100 is an example of the light emitting device. Also, the above-described light emitting unit 110 is an example of the illumination unit. Furthermore, the above-described drive control unit 108 is an example of the illumination control unit. Furthermore, the above-described illumination pattern detection unit 212 is an example of the illumination pattern detection unit. Furthermore, the above-described vibration pattern generation units 222 and 234 and vibration control units 214, 226 and 240 are examples of the vibration control unit.

It should be understood by those skilled in the art that various modifications, combinations, sub-combinations and alterations may occur depending on design requirements and other factors insofar as they are within the scope of the appended claims or the equivalents thereof.

For example, an LED array formed from a plurality of LEDs (Light Emitting Diode) can be used instead of the projector 100. Additionally, in the above-described embodiments, technologies are proposed which provide a tactile feedback, allowing to feel the shape or the colour of mainly a two-dimensional or three-dimensional image. However, these technologies can also be applied to a public guidance system. For example, a configuration can be achieved for providing the vibration device 200 with a specific vibration pattern by using a blinking pattern of a LED light source when a user is moving along a correct route. On the other hand, a configuration can also be achieved for providing a specific vibration pattern when a user moves along a wrong route.

The present application contains subject matter related to that disclosed in Japanese Priority Patent Application JP 2009-68632 filed in the Japan Patent Office on Mar. 19, 2009, the entire content of which is hereby incorporated by reference.

What is claimed is:

1. A light-tactility conversion system comprising:
    a light emitting device including
        an illumination unit capable of emitting light at a same time to a plurality of illumination areas in different illumination patterns; and
        an illumination control unit for controlling the illumination unit and making the illumination unit project an image, and also for controlling the illumination patterns in units of pixels of the projected image and making the illumination unit emit light to specific illumination areas in specific illumination patterns, and a vibration device including
an illumination pattern detection unit for detecting an illumination pattern of light received from the light emitting device; and
a vibration control unit for generating a vibration pattern corresponding to the illumination pattern detected by the illumination pattern detection unit and vibrating an oscillator in the vibration pattern.

2. The light-tactility conversion system according to claim 1, wherein
the vibration control unit transmits a drive signal for vibrating the oscillator by a specific vibration amount, in synchronization with the illumination pattern detected by the illumination pattern detection unit.

3. The light-tactility conversion system according to claim 2, wherein
the illumination control unit makes light emitted in a specific pattern different for each colour, according to the colour of each pixel of the projected image.

4. The light-tactility conversion system according to claim 1, wherein
the illumination control unit controls, by using a specific illumination pattern indicating a specific code, the illumination unit to emit light to a specific illumination area in the specific illumination pattern, and
the vibration control unit regenerates the specific code corresponding to the illumination pattern detected by the illumination pattern detection unit, and vibrates the oscillator in a specific vibration pattern corresponding to the specific code.

5. The light-tactility conversion system according to claim 4, wherein
the illumination control unit makes light emitted in a specific pattern different for each colour, according to the colour of each pixel of the projected image.

6. The light-tactility conversion system according to claim 1, wherein
the light emitting device has first and second illumination units with different light emitting directions,
the illumination control unit controls the first and second illumination units and makes the first and second illumination units emit light to specific target areas in specific illumination patterns,
the illumination pattern detection unit detects each of the illumination patterns of the light emitted from the first and second illumination units included in the light emitting device, and
the vibration control unit makes the oscillator vibrate in a vibration pattern associated in advance with a combination of the illumination pattern of the light emitted from the first illumination unit and the illumination pattern of the light emitted from the second illumination unit.

7. The light-tactility conversion system according to claim 6, wherein
the illumination control unit controls the first and second illumination units, and, by using specific illumination patterns indicating specific codes, makes the first and second illumination units emit light to specific illumination areas in the specific illumination patterns, and
the vibration control unit regenerates each of the specific codes corresponding to the respective illumination patterns of light emitted from the first and second illumination units, the illumination patterns being detected by the illumination pattern detection unit, and vibrates the oscillator in a specific vibration pattern corresponding to a combination of the specific codes.

8. The light-tactility conversion system according to claim 1, wherein
the illumination unit includes
a light source for emitting light;
a plurality of mirrors provided for each pixel of the projected image, the plurality of mirrors being capable of guiding the light emitted from the light source to a lens; and
a mirror control unit for controlling an angle of each mirror, and
the mirror control unit controls the illumination patterns in units of pixels of the projected image by changing the angle of each mirror according to a control by the illumination control unit.

9. A tactile feedback providing method comprising the steps of:
controlling an illumination device capable of emitting light at a same time to a plurality of illumination areas in different illumination patterns and making the illumination device project an image, and also controlling the illumination patterns in units of pixels of the projected image and making the illumination device emit light to specific illumination areas in specific illumination patterns;
receiving the light emitted under a control in the step of controlling;
detecting an illumination pattern of the light received in the step of receiving; and
generating a vibration pattern corresponding to the illumination pattern detected in the step of detecting and vibrating an oscillator in the vibration pattern.

* * * * *